US007865385B2

(12) United States Patent
Maple et al.

(10) Patent No.: US 7,865,385 B2
(45) Date of Patent: Jan. 4, 2011

(54) METHODS AND SYSTEMS FOR MODELING PROCESSES IN AIRLINES AND OTHER INDUSTRIES, AND FOR SIMULATING AND VALUING THE EFFECTS OF VARIOUS PRODUCTS AND SERVICES ON THOSE PROCESSES

(75) Inventors: Michael W. Maple, Seattle, WA (US); Kenneth J. Goosen, Seattle, WA (US); William H. Syblon, Seattle, WA (US); Michael B. McLaughlin, Seattle, WA (US); James O. Halvorson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1555 days.

(21) Appl. No.: 10/988,851

(22) Filed: Nov. 15, 2004

(65) Prior Publication Data
US 2006/0112139 A1    May 25, 2006

(51) Int. Cl.
*G06F 9/46* (2006.01)
(52) U.S. Cl. .................. 705/8; 705/7; 705/9; 705/11; 705/500
(58) Field of Classification Search .................. 705/7, 705/8
See application file for complete search history.

(56) References Cited

U.S. PATENT DOCUMENTS

| 7,543,276 B2* | 6/2009 | Pfander et al. ............... 717/125 |
| 2002/0194056 A1* | 12/2002 | Summers ..................... 705/10 |
| 2003/0033182 A1* | 2/2003 | Stok et al. ..................... 705/7 |
| 2004/0073442 A1* | 4/2004 | Heyns et al. ................... 705/1 |
| 2004/0081183 A1* | 4/2004 | Monza et al. ................ 370/412 |
| 2005/0096950 A1* | 5/2005 | Caplan et al. .................. 705/7 |
| 2005/0209732 A1* | 9/2005 | Audimoolam et al. ....... 700/216 |
| 2006/0074725 A1* | 4/2006 | Huang et al. ................... 705/7 |
| 2006/0080326 A1* | 4/2006 | Akbay et al. ................ 707/100 |
| 2006/0106637 A1* | 5/2006 | Johnson et al. ................ 705/1 |
| 2007/0288212 A1* | 12/2007 | Messmer et al. ............... 703/6 |

OTHER PUBLICATIONS

Khan, M.R. "Business process reengineering of an air cargo handling process", Int. J. Production Economics 63 (2000) 99-108.*
Aler, et al. "A knowledge-based approach for business process reengineering,Shamash", Knowledge-Based Systems 15 (2002) 473-483.*
Kim, et al. "Dynamic process modeling for BPR: A computerized simulation approach", Information & Management 32 (1997) 1-13.*

* cited by examiner

*Primary Examiner*—Romain Jeanty
*Assistant Examiner*—Mark A Fleischer
(74) *Attorney, Agent, or Firm*—Perkins Coie LLP

(57) ABSTRACT

Methods and systems for modeling functional processes in enterprises, and for simulating and valuing the effects of various products and services on those processes, are described herein. A method in accordance with one aspect of the invention for marketing at least one of products and services to an operator of an enterprise includes presenting a first process model and a second process model. The first process model can graphically illustrate how at least one functional group in the enterprise responds to a selected operational circumstance. The second process model can graphically illustrate how the at least one functional group responds to the selected operational circumstance after the enterprise has implemented at least one of a selected product and a selected service configured to facilitate operation of the enterprise.

21 Claims, 25 Drawing Sheets

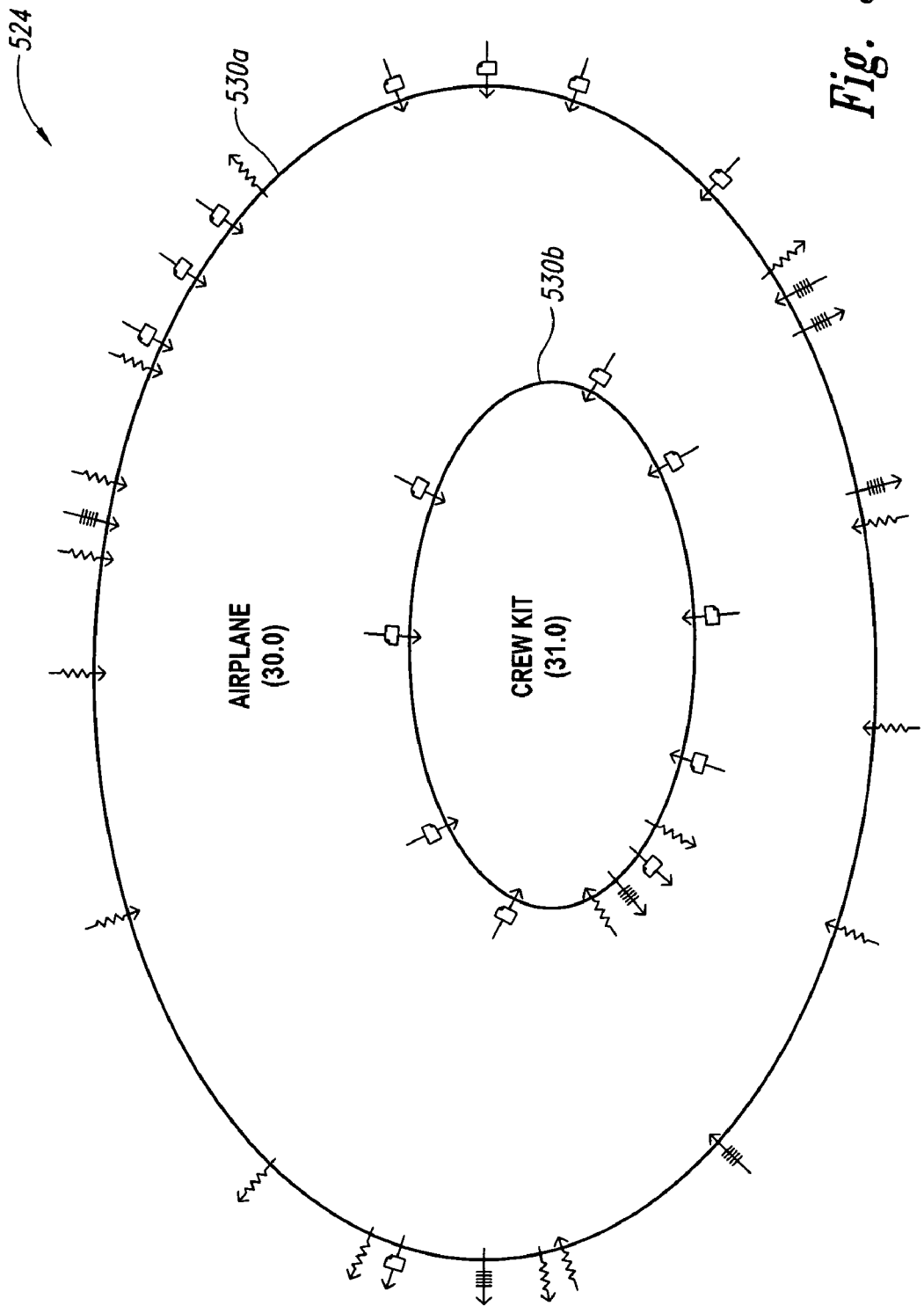

Fig. 16

| FLEET INFORMATION | | AIRLINE PROCESS MODEL | | | | CHALLENGE CHOOSER | | | | SOLUTION CHOOSER | | | | AIRLINE OPERATIONS | | | | VALUE CALCULATOR | | | |
|---|---|---|---|---|---|---|---|---|---|---|---|---|---|---|---|---|---|---|---|---|---|
| | | 737-400 | | 767-200 | | 767-300 | | 747-100 | | 747-200 | | 747-300 | | 747-400 | | 777-200 | | 777-300 | | 7E7-8 | |
| | | TI | As Is W/I | TI | As Is W/I | TI | As Is W/I | TI | As Is W/I | TI | As Is W/I | TI | As Is W/I | TI | As Is W/I | TI | As Is W/I | TI | As Is W/I | TI | As Is W/I |
| Efficiency Productivity & Cost Reduction | Tech. Info. | 8 | | 3 | | 31 | | 3 | | 18 | | 14 | | 42 | | 14 | | 8 | | | |
| | Config. MM | 8 | | 3 | | 31 | | 3 | | 18 | | 14 | | 42 | | 14 | | 8 | | | |
| | Crew | 8 | | 3 | | 31 | | 3 | | 18 | | 14 | | 42 | | 14 | | 8 | | | |
| | AOC | 8 | | 3 | | 31 | | 3 | | 18 | | 14 | | 42 | | 14 | | 8 | | | |
| | Outsourced | 8 | | 3 | | 31 | | 3 | | 18 | | 14 | | 42 | | 14 | | 8 | | | |
| Availability & Reliability | Maint. Comp. | 8 | | 3 | | 31 | | 3 | | 18 | | 14 | | 42 | | 14 | | 8 | | | |
| | Pro Health | 8 | | 3 | | 31 | | 3 | | 18 | | 14 | | 42 | | 14 | | 8 | | | |
| | Reliability | 8 | | 3 | | 31 | | 3 | | 18 | | 14 | | 42 | | 14 | | 8 | | | |
| Safety, Security, Reliability | Paperless Flt. Ops. | 8 | | 3 | | 31 | | 3 | | 18 | | 14 | | 42 | | 14 | | 8 | | | |
| | Maint. Eval. | 8 | | 3 | | 31 | | 3 | | 18 | | 14 | | 42 | | 14 | | 8 | | | |
| | Train Ops. | 8 | | 3 | | 31 | | 3 | | 18 | | 14 | | 42 | | 14 | | 8 | | | |
| | Enhanced Flt. Ops. | 8 | | 3 | | 31 | | 3 | | 18 | | 14 | | 42 | | 14 | | 8 | | | |
| Passenger Exp & Airplane Life Ext. | Interior Recessed | 8 | | 3 | | 31 | | 3 | | 18 | | 14 | | 42 | | 14 | | 8 | | | |
| | Cabin Reconfig. | 8 | | 3 | | 31 | | 3 | | 18 | | 14 | | 42 | | 14 | | 8 | | | |
| | IFE | 8 | | 3 | | 31 | | 3 | | 18 | | 14 | | 42 | | 14 | | 8 | | | |
| | PAX to Freighter | 8 | | 3 | | 31 | | 3 | | 18 | | 14 | | 42 | | 14 | | 8 | | | |

METHODS AND SYSTEMS FOR MODELING PROCESSES IN AIRLINES AND OTHER INDUSTRIES, AND FOR SIMULATING AND VALUING THE EFFECTS OF VARIOUS PRODUCTS AND SERVICES ON THOSE PROCESSES

TECHNICAL FIELD

The following disclosure relates generally to methods and systems for modeling operational processes in airlines and other commercial and non-commercial industries and, more particularly, to computer-implemented methods and systems for simulating and valuing the effects of various products and services on those processes.

BACKGROUND

Operating an airline or other large commercial or non-commercial enterprise typically requires the coordinated efforts of many different functional groups. Generally, each of the different groups is responsible for managing a different part of the enterprise. A typical airline, for example, can include different functional groups for managing flight operations, aircraft maintenance, passenger services, and other aspects of the business necessary for day-to-day operations. The efficiency with which these different functional groups cooperate to run the airline can have a direct effect on the profitability and, ultimately, the success of the airline in a competitive marketplace.

Conventional methods for modeling the complex operations of airlines and other large enterprises typically include process flow charts and other types of schematic diagrams that attempt to illustrate the inter-workings of the different functional groups. Although these methods may illustrate some functional relationships at a relatively high level, they are of limited value in analyzing process interactions because they typically lack detailed information about the various attributes (e.g., cost, time, etc.) associated with each process. Further, these methods also tend to lack a detailed description of the routing and sequencing of information flows between the different functional groups. As a result, such methods offer little assistance in identifying problem areas and assessing the impact of changes to a particular process.

There are various types of products and services available to airlines and other large enterprises to make their operations more efficient. In the airline context, for example, such products include various software applications for monitoring, scheduling, and carrying out aircraft maintenance; for updating maintenance manuals with service bulletins; and for electronically documenting aircraft log book entries and other related information.

One problem facing companies that produce and market such products and services is how to justify the investment in the product or service to the airline operator. That is, how best to make the business case to the potential customer. A typical marketing approach is to "demo" the product or service using a fictitious business model. The downside of this approach, however, is that the fictitious model may or may not be a realistic simulation of the actual airline. As a result, the airline operator may have a hard time visualizing and understanding the benefits of the product or service, and may remain unconvinced of the value to their airline.

SUMMARY

The following Summary is provided for the benefit of the reader, and is not intended to limit the scope of the invention as defined by the claims in any way. The present invention is directed generally toward methods and systems for modeling operational processes in airlines and other commercial and non-commercial industries, and for simulating and valuing the effects of various products and services on those processes. A method in accordance with one aspect of the invention for marketing products and services to an operator of an enterprise includes presenting a first process model and a second process model. The first process model can graphically illustrate how at least one functional group in the enterprise responds to a selected operational circumstance. The second process model can graphically illustrate how the functional group responds to the selected operational circumstance after the enterprise has implemented at least one of a selected product and a selected service configured to facilitate operation of the enterprise. In one embodiment, presenting a first process model can include presenting a model that schematically illustrates the enterprise as a plurality of different functional groups. In another embodiment, presenting a first process model can include presenting a model that schematically illustrates the enterprise as a plurality of different functional groups in which each functional group is responsible for performing a plurality of defined functions. Further, in various embodiments the enterprise can be an airline, and presenting a first process model can include presenting a model that graphically illustrates the airline as a plurality of different functional groups in which each functional group is responsible for performing a plurality of defined functions.

A computer-implemented method in accordance with another aspect of the invention for marketing products and services includes receiving a selection of an enterprise and a selection of an event. The method can further include displaying an "as is" event model graphically illustrating how the selected enterprise responds to the selected event. In one embodiment, the computer-implemented method can further include receiving a selection of a product, a service, or a product and service, and displaying a "what if" event model. In this embodiment, the "what if" event model can graphically illustrate how the enterprise responds to the selected event after the enterprise has implemented the selected product, service, or product and service.

A computer-readable medium containing computer-executable instructions configured in accordance with a further aspect of the invention causes a computer to automatically provide information about a product, a service, or a product and a service by a method that includes receiving a selection of an enterprise, and receiving a selection of an event. The method can further include displaying an "as is" event model graphically illustrating how the selected enterprise responds to the selected event. The method can additionally include receiving a selection of a product, service, or product and service, and displaying a "what if" event model. The "what if" event model can graphically illustrate how the selected enterprise responds to the selected event after the enterprise has implemented the selected product, service, or product and service.

BRIEF DESCRIPTION OF THE DRAWINGS

FIGS. 5B-I illustrate enlarged portions of the airline process model of FIG. 5A.

FIG. 16 is a schematic diagram of a display page that enables a user to "scale-up" benefits associated with selected products and services in accordance with another embodiment of the invention.

DETAILED DESCRIPTION

The following disclosure describes computer-implemented methods and systems for modeling the operations of airlines and other commercial and non-commercial industries, and for simulating and valuing the effects of different products and services on those operations. Specific details of several embodiments of the invention are described below to provide a thorough understanding of the embodiments. Other details describing well-known aspects of airlines and airline operational systems are not set forth below, however, to avoid unnecessarily obscuring the description of the various embodiments. Furthermore, although various embodiments of the invention are described below, those of ordinary skill in the art will understand that the invention can have other embodiments in addition to those described below. Such embodiments may lack one or more of the elements described below or, conversely, they may include other elements in addition to those described below.

Certain embodiments are described below in the context of computer-executable instructions performed by a general-purpose computer, such as a personal computer. The computer-executable instructions can be stored on various types of computer-readable media including, for example, hard disks, floppy disks, or a CD-ROMs. In other embodiments, these instructions can be stored on a server computer system and accessed via a computer network such as an intranet or the Internet. Because the basic structures and functions often associated with computer systems and related routines are well known, they have not been shown or described in detail here to avoid unnecessarily obscuring the described embodiments.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

Figure 1:
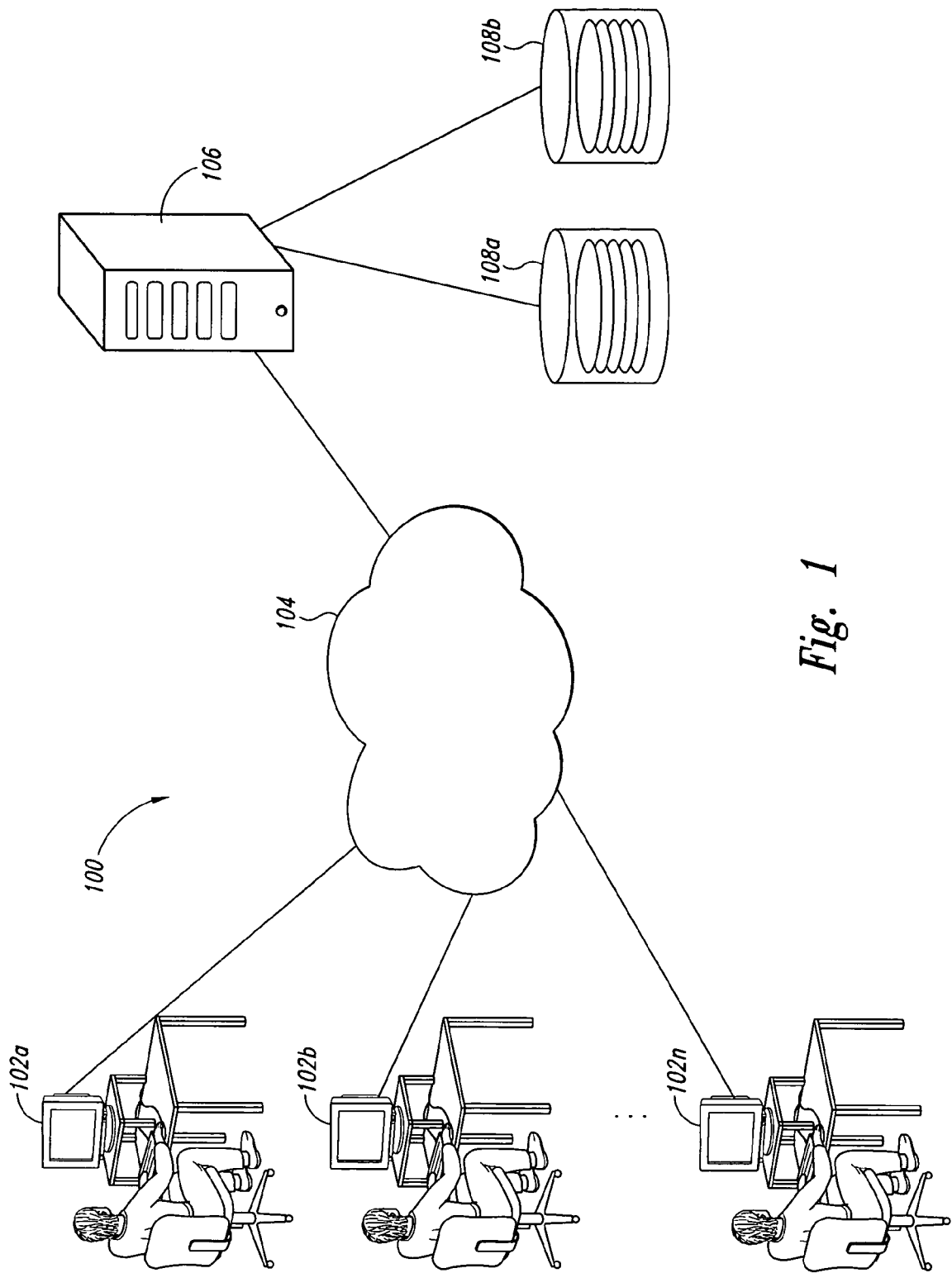
FIG. 1 is a schematic diagram of a system suitable for implementing various embodiments of the present invention.

FIG. 1 is a schematic diagram of a system 100 suitable for implementing various embodiments of the present invention. The system 100 can include a plurality of user computers 102a-η operably connected to a server computer 106 via a communications link 104. Each of the user computers 102 can include a central processing unit, memory devices, input devices (e.g., a keyboard and a pointing device), output devices (e.g., a display screen or other device), and data storage devices (e.g., disk drives). The memory and storage devices can include computer-readable media that contain computer-executable instructions for implementing many of the processes, routines, and display pages of the present invention. As described in greater detail below, these processes, routines, and display pages can be used to model the various operational processes of an airline and graphically simulating the value that various products and services can have on those processes.

The user computers 102 can further include a browser module (not shown) that enables a user to access and exchange data with the server computer 106 and other sites via the communications link 104. The communications link 104 can be a computer network, such as a local area network (LAN), an intranet, or the Internet. The communications link 104 can be implemented using any one of a wide variety of conventional communications configurations including both wired and wireless types. Further, any of a wide variety of communications protocols can be used to transmit data via the communications link 104, including both public and proprietary protocols. The server computer 106 can be configured to retrieve data from a plurality of databases 108a-b and transmit the data in various forms to the user computers 102 via the communications link 104. Such data can include, for example, various information about different airlines, such as fleet size and make-up, routes, etc.

The system 100 is but one example of a suitable system for implementing various embodiments of the invention as described in greater detail below.

Accordingly, the methods and systems disclosed herein are not limited to implementation on the system 100, but can be implemented on other types of general- and/or special-purpose computing systems or configurations. Examples of well-known computing systems, environments, and/or configurations that may be suitable for use with aspects of the invention include personal computers (PCs), server computers, portable and hand-held devices such as personal digital assistants (PDAs), laptop and tablet PCs, multiprocessor systems, microprocessor-based systems, set-top boxes, programmable consumer electronics, network PCs, mini-computers, mainframe computers, and/or distributed computing environments that include one or more of the above systems or devices.

Figure 2:
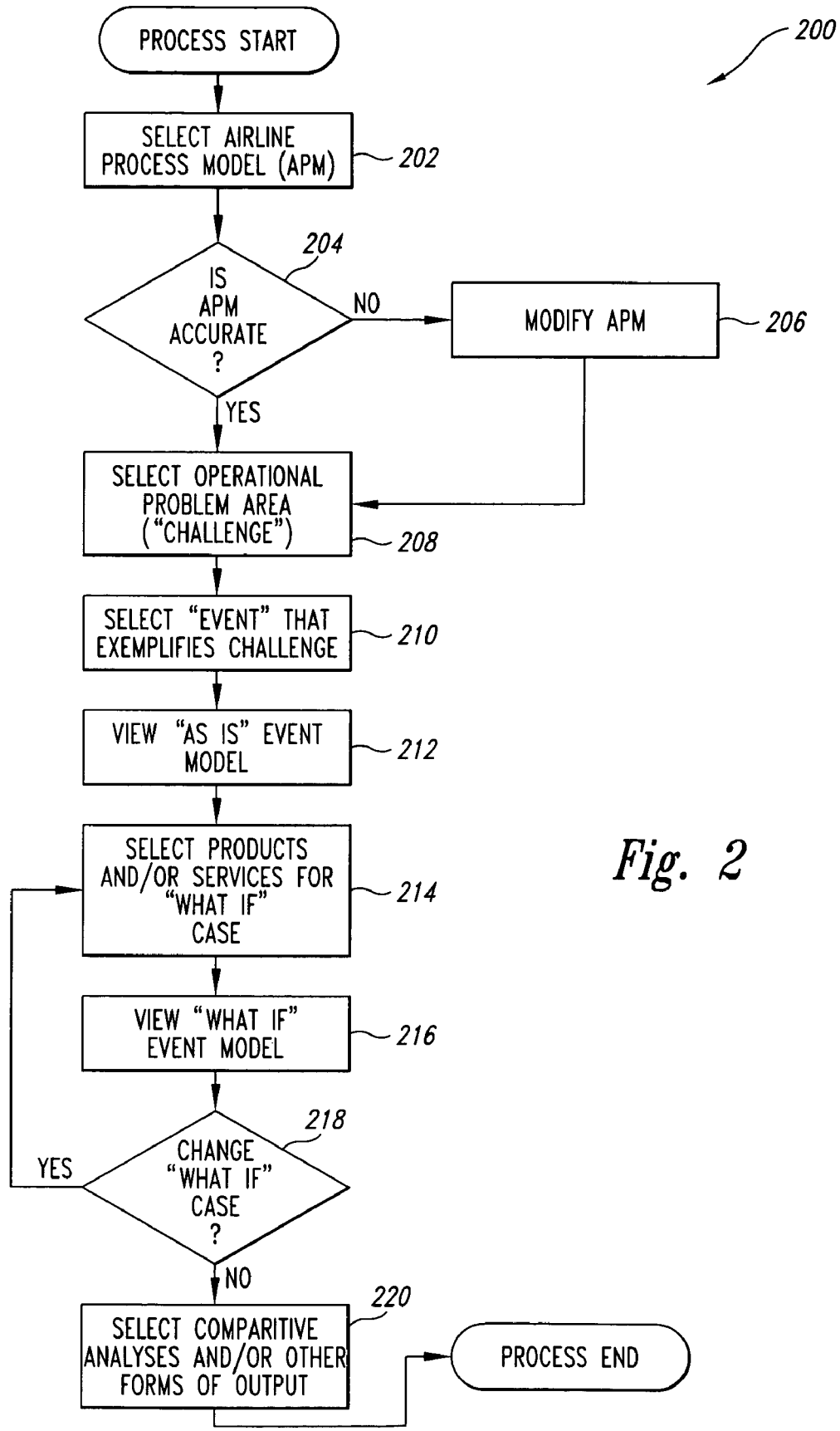
FIG. 2 is a flow diagram illustrating a process for simulating and/or valuing the effects of various products and/or services on an operational model in accordance with an embodiment of the invention.

FIG. 2 is a flow diagram illustrating a process 200 for simulating and/or valuing the effects of various products and/or services on an operational model in accordance with an embodiment of the invention. In one aspect of this embodiment, the process 200 can be performed by a sales agent of the products and services by operating one of the user computers 102 described above with reference to FIG. 1. The sales agent may be performing the process 200 for the benefit of a potential customer who is interested in seeing if there is a business case that would justify purchasing the products and services.

For purposes of illustration, the process 200 is described below in the context of an airline process model. Thus, in this particular embodiment, the process 200 can be used by a seller of airline-related products and services to demonstrate the benefits of the products and services to a potential customer, i.e., an airline operator. As described in greater detail below, such airline-related products and services can include, for example, various software products, database systems, document management systems, and hand-held computational devices that facilitate efficient airline operation. Although the process 200 is described below in an airline context, those of ordinary skill in the art will appreciate that other embodiments of the invention can be used in other commercial and noncommercial industries in various business sectors including both transportation and non-transportation related enterprises. Such industries can include, for example, marine, ground, and space transportation industries; military fleet operations; etc.

In the illustrated embodiment, the process 200 begins in block 202 with the selection of an "as is" airline process model (APM). As used herein, the term "as is" APM refers to an organized assembly of graphical and/or numerical data that describes functions, processes, information elements, and/or other parts of a global air transportation system (GATS). An example of an "as is" APM is described in greater detail below with reference to FIG. 5. In this embodiment, selecting the "as is" APM causes the APM to be displayed on a display screen or other suitable viewing device. The user (e.g., a sales agent) and/or others (e.g., an airline operator) can then view the "as is" APM to gain a better understanding of how the various functional groups in the airline currently interact during normal day-to-day operations. Further, in decision block 204, the user can determine if the "as is" APM accurately reflects the user's understanding of the current airline processes. If not, the user can modify the "as is" APM in block 206. As described in greater detail below, this modification can take the form of manipulating graphical data on the display screen and/or, alternatively, accessing a database to change various input data used to generate the "as is" APM.

After modifying the "as is" APM, or if the "as is" APM was accurate as initially displayed, the user can proceed to block 208 and select an area of the "as is" APM that the user feels needs improvement from, for example, a cost, schedule, or efficiency standpoint. In the present disclosure, such problem areas are referred to as "challenges," and can relate to, for example, certain aspects of aircraft maintenance, flight schedule reliability, pilot log book entries, etc.

After selecting a challenge, the user can select an "event" in block 210 that is otherwise associated with the selected challenge. In this embodiment, the term "event" refers to a particular operational circumstance to which the "as is" APM responds. For example, a fuel indicator malfunction is an event that is associated with the challenge of maintaining aircraft schedule reliability.

After the user has selected a challenge and one or more corresponding events, an "as is" event model can be displayed for viewing by the user. An example of an "as is" event model is described in greater detail below with reference to FIG. 10. In one aspect of this embodiment, the "as is" event model can be a portion of the overall "as is" APM that graphically illustrates the sequence of functions that must be executed by the portion of the "as is" APM to respond to the selected event. That is, the "as is" event model provides a graphical simulation of the event-specific path for responding to the selected event. Viewing the "as is" event model allows the user to gain a better understanding of the various functional groups that have to respond to a particular event in the "as is" APM. Further, by viewing this model, the user is able to identify where inefficient processes exist leading to increased time or cost impacts to operations. With this information in mind, the user can proceed to block 214 and select one or more products and/or services that, when implemented, enable the APM to respond to the particular event in a more efficient and less costly manner. After the various products and/or services have been selected, the user can proceed to block 216 and view a "what if" event model.

In a further aspect of this embodiment, the "what if" event model is similar to the "as is" event model in that it reproduces a particular portion of the overall APM. However, the "what if" event model differs from the "as is" event model in that the "what if" event model graphically and/or numerically illustrates the greater efficiencies and more streamlined operations that result from implementing the selected products and/or services. Accordingly, one benefit of this embodiment is that it can quickly and easily provide a visual description of the benefits that implementing a particular product and/or service can have to the operations of an airline or other major enterprise.

If the user wishes to select other products and/or services and view the effects of implementing them, the user can do so in decision block 218 by returning to block 214 and proceeding as described above. Alternatively, the user can proceed to block 220 and select various forms of comparative analyses and/or other forms of output that illustrate the operational impact and value of implementing the "what if" model. Such comparative analyses can include, for example, a comparison of the relative costs between the "as is" event model and the "what if" event model. Other forms of comparative analyses can include a graphical display of the percent increase in on time schedule performance for the airline that results from implementing the selected products and/or services. Yet other forms of comparative analyses can be selected by the user including cash flow analyses, etc. In addition to the foregoing, the user can also request various forms of output in the form of data reports, executive summaries, business cases, business proposals, etc. These and other aspects of the present invention are described in greater detail below with reference to the corresponding display pages.

Figure 3:
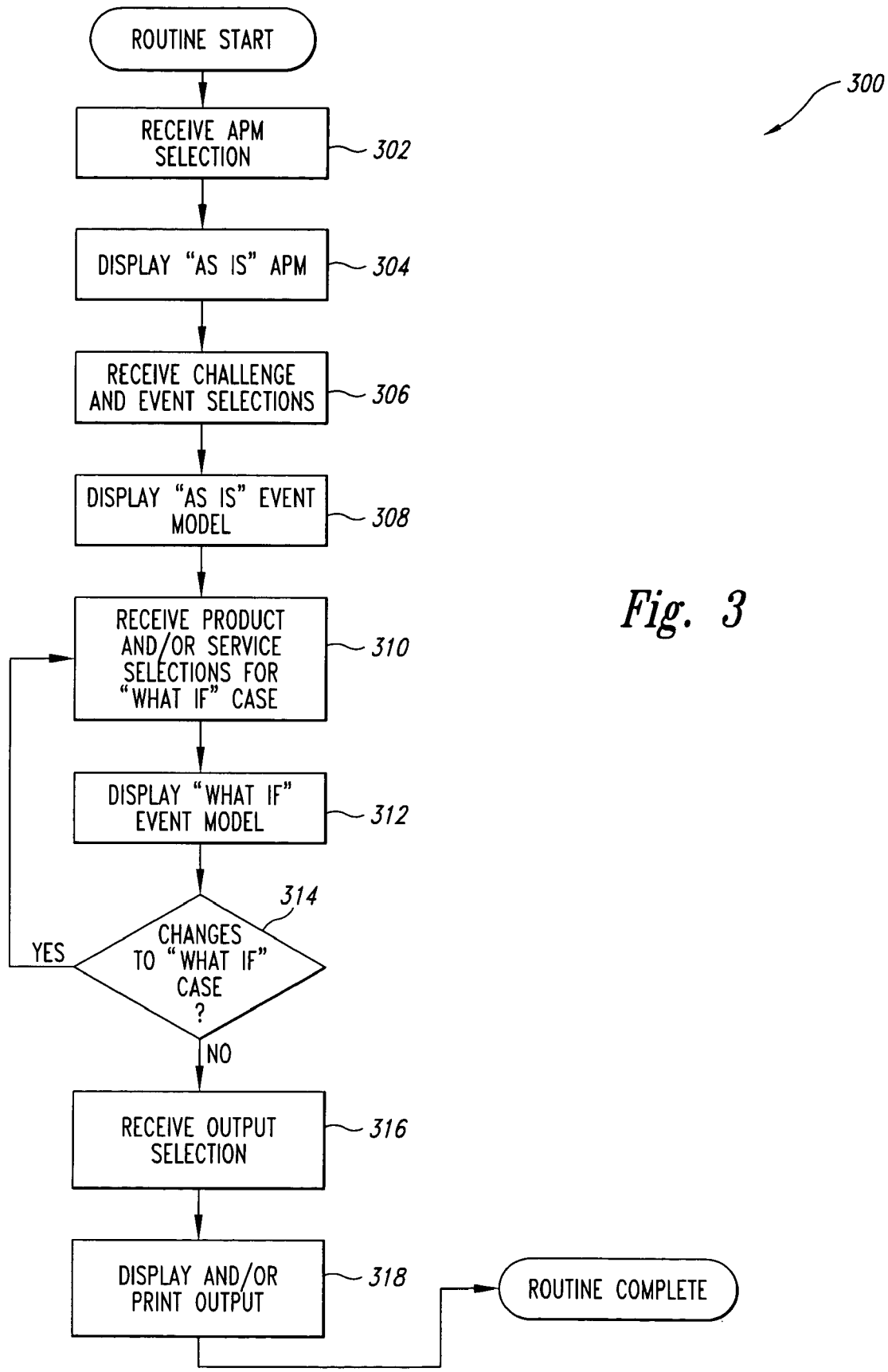
FIG. 3 is a flow diagram illustrating a routine for displaying a "what if" event model and providing various forms of output relating to the event model in accordance with an embodiment of the invention.

FIG. 3 is a flow diagram illustrating a routine 300 for displaying a "what if" event model and providing various forms of output relating to the event model in accordance with an embodiment of the invention. In one aspect of this embodiment, the routine 300 can be performed by one of the user computers 102 described above with reference to FIG. 1 in accordance with computer-executable instructions stored on a corresponding computer-readable medium. In other embodiments, the routine 300 can be implemented by other computational devices.

The routine 300 begins in block 302 by receiving an "as is" APM selection from a user. As set forth above, in one embodiment, the "as is" APM is an organized collection of graphical and numerical data that describes the current functions, processes, information elements, and other parts of a particular airline. In block 304, the routine 300 displays the "as is" APM in response to the selection. In block 306, the routine 300 receives challenge and event selections from the user. In block 308, the routine 300 displays an "as is" event model in response to receiving the challenge and event selections.

After displaying the "as is" event model, in block 310 the routine 300 can receive product and/or service selections from the user corresponding to a "what if" case. In response to receiving these selections, the routine 300 can display a corresponding "what if" event model in block 312. In decision block 314, the routine 300 checks for any changes to the "what if" case from the user. If there are any changes, the routine 300 returns to block 310 and updates the "what if" case to reflect the changes (e.g., additions and/or deletions of products and services).

In block 316, the routine 300 receives output selections from the user. As described in greater detail below, these output selections can include requests for various forms of textual and/or graphical output including cost comparisons, time comparisons, and other forms of analyses that compare the "as is" case to the "what if" case. Such output can further include printouts of various reports such as executive summaries, business cases, and/or proposals. In block 318, the routine 300 displays and/or prints the requested output before ending.

Figure 4:
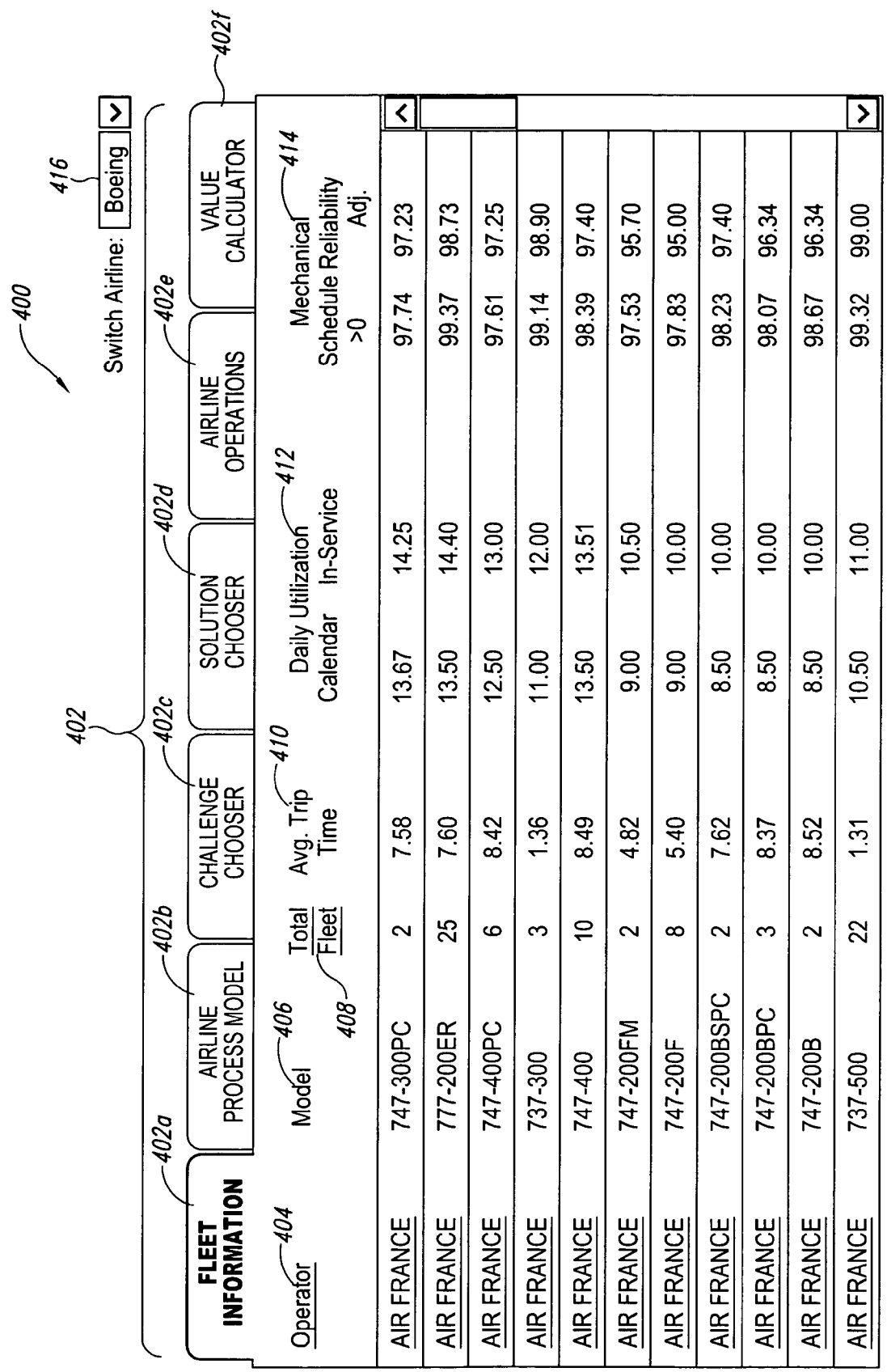
FIG. 4 is a schematic diagram of a display page presenting aircraft fleet information in accordance with an embodiment of the invention.

FIG. 4 is a schematic diagram of a display page 400 for presenting aircraft fleet information in accordance with an embodiment of the invention. The fleet information relates to the particular airline identified in a column 404. The information can include, for example, the particular aircraft models in the fleet, as identified in column 406, and the total number of each model, as shown in column 408. Further, the average trip time for each model can be shown in column 410, the daily utilization time can be shown in column 412, and the mechanical schedule reliability can be shown in column 414. The display page 400 can further include an airline drop down menu 416. The drop down menu 416 can include a list of the airlines from which the user can select. By selecting one of the listed airlines, the corresponding fleet information for that airline is displayed on a corresponding version of the display page 400.

In one aspect of this embodiment, the information presented on the display page 400 can be used to generate various portions of the "as is" and "what if" event case comparisons described in greater detail below. Although particular types of information are illustrated in FIG. 4 by way of example, in other embodiments, the display page 400 and extensions thereof can include other types of information. Like many of the display pages described below, the display page 400 can include a plurality of page tabs 402 (identified individually as page tabs 402a-f) arranged along an upper portion of the display page 400. By selecting one of the tabs 402, the user can bring up a corresponding display page containing the information and/or functionality identified by the tab. For example, the display page 500 discussed below with reference to FIG. 5A can be displayed in response to the user selecting the APM tab 402b.

Figure 5A:
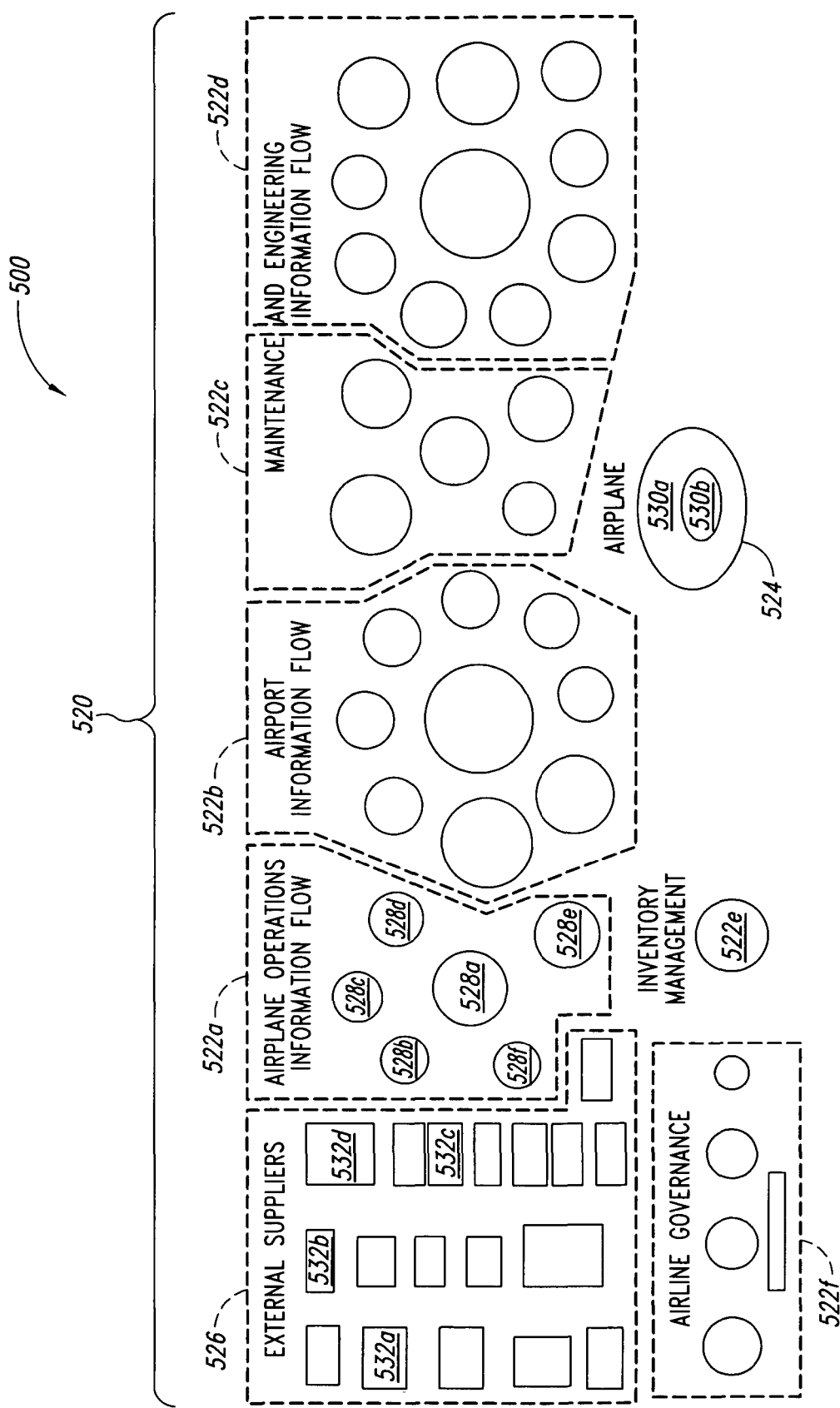
FIG. 5A is a schematic diagram of a display page illustrating an airline process model configured in accordance with an embodiment of the invention.
Figure 5B:
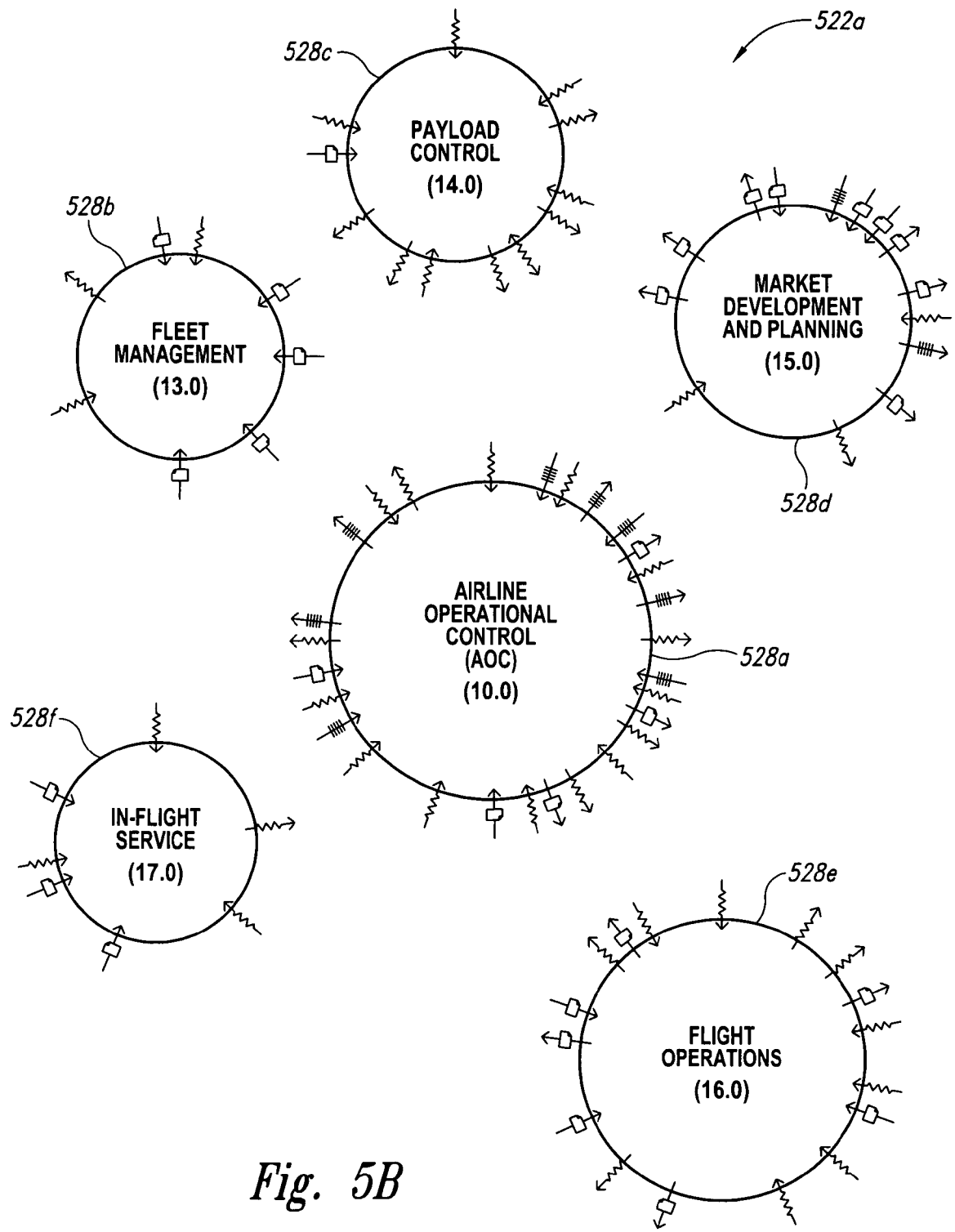
Figure 5C:
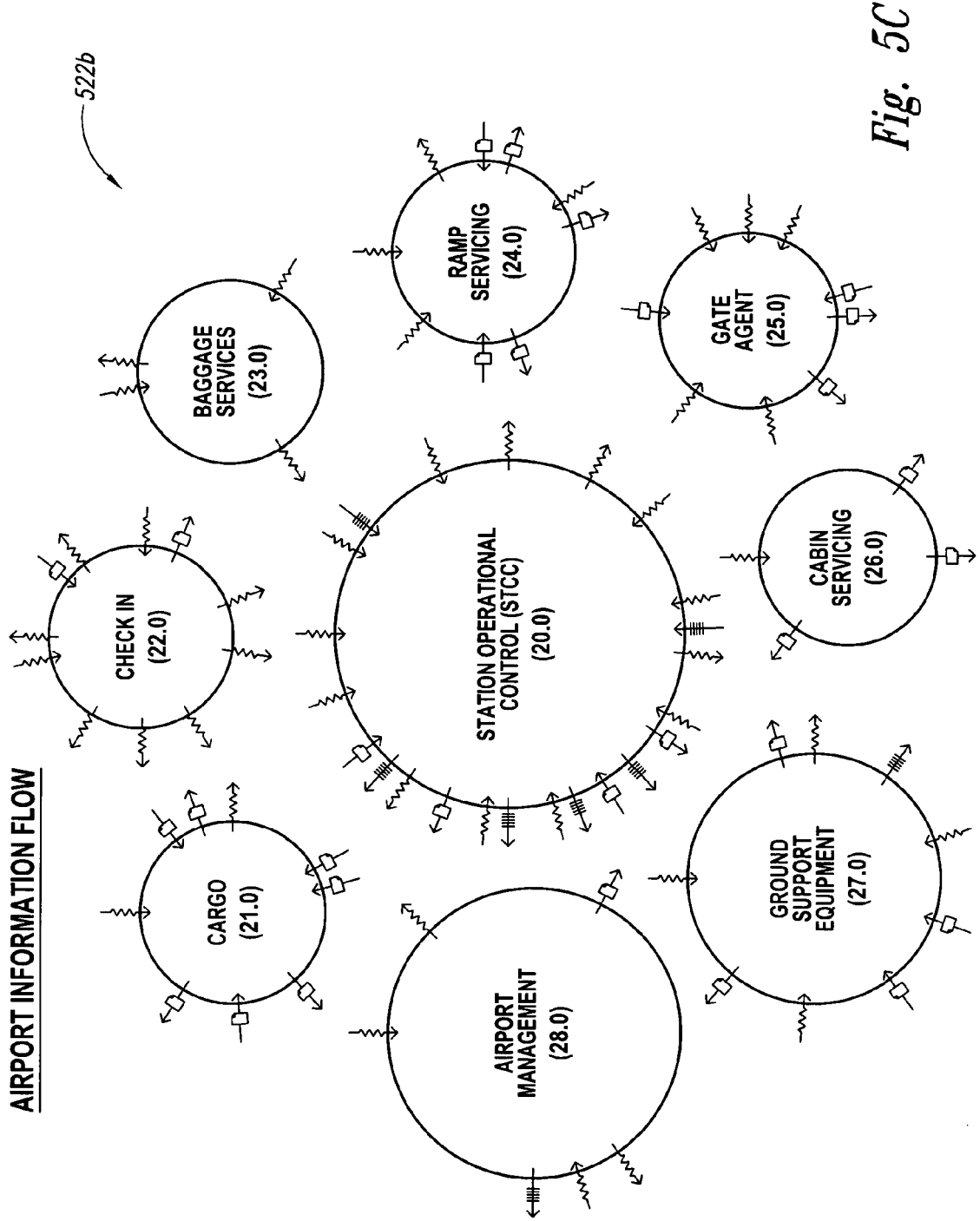
Figure 5D:
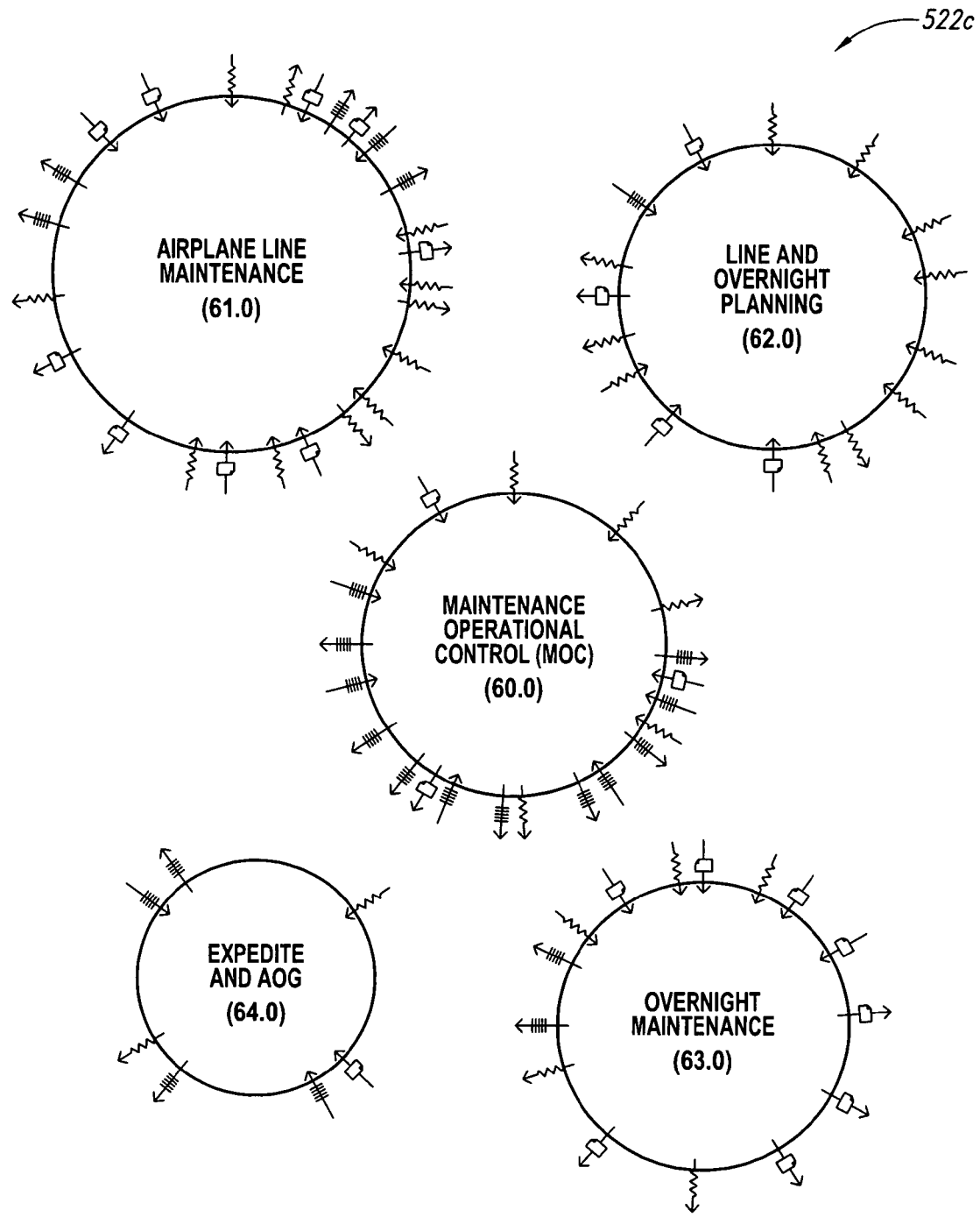
Figure 5E:
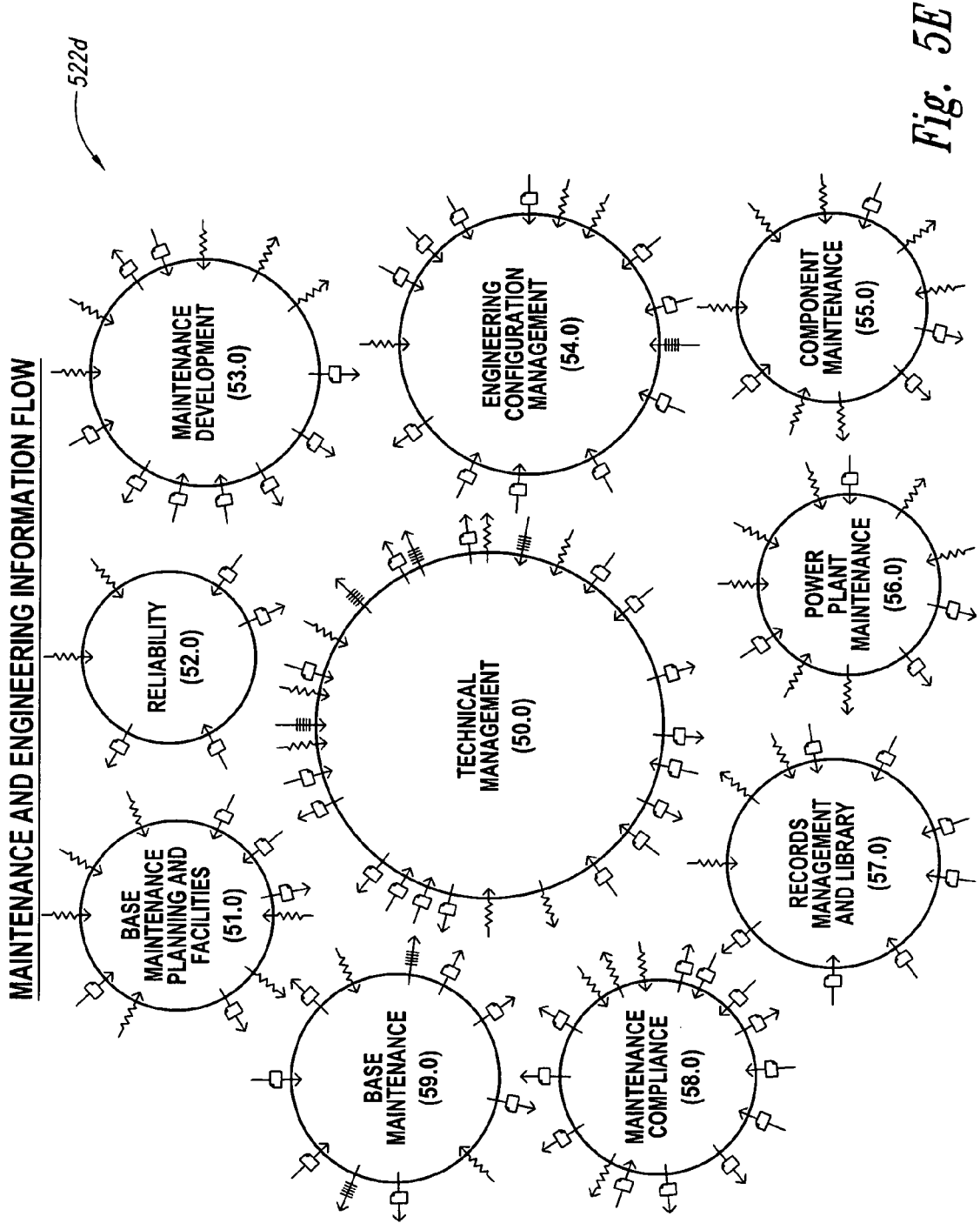
Figure 5F:
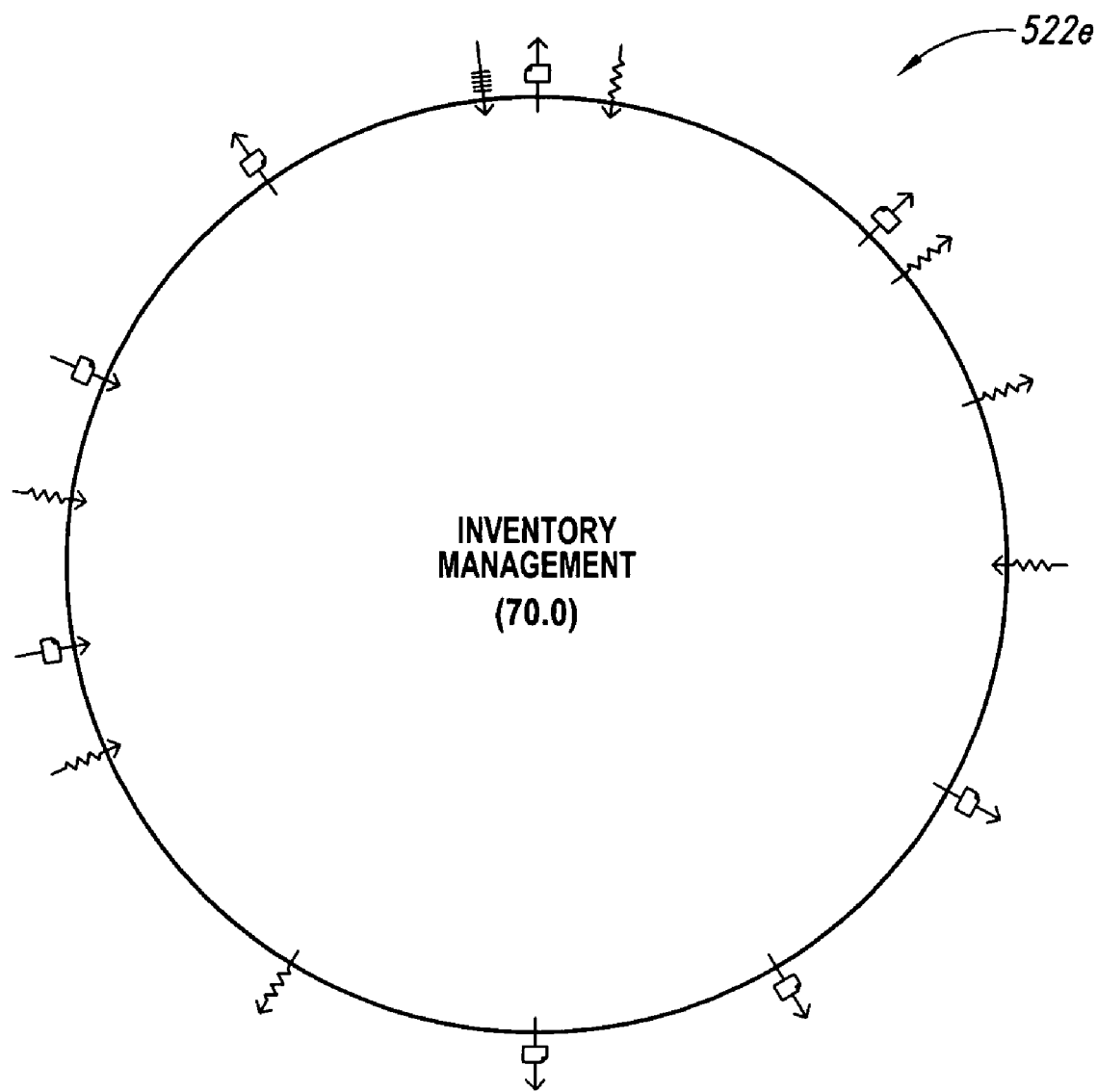

FIG. 5A is a schematic diagram of a display page 500 illustrating an airline process model 520 ("APM" 520) configured in accordance with an embodiment of the invention, and FIGS. 5B-H present enlarged portions of the APM 520 in more detail than FIG. 5A. The APM 520 is an organized data structure that graphically illustrates the various processes performed by different functional groups in a selected airline. In the illustrated embodiment, the different functional groups are represented by circles and ellipses, and are divided among different functional areas. The different functional areas can include Airline Operations 522a, Airport Information 522b, Aircraft Maintenance and Engineering 522c, Inventory Management 522d, and Airline Governance 522e. In other embodiments, the APM 520 can include other functional areas.

By way of example, the Airline Operations functional area 522a can include functional groups responsible for Airline Operational Control 528a, Fleet Management 528b, Payload Control 528c, Market Development and Planning 528d, Flight Operations 528e, and In-flight Service 528f. Each of the foregoing functional groups 528 can perform a wide variety of different functions that are related to the overall function area. These individual functions are not listed in FIG. 5 because of size constraints. By way of example, however, the Airline Operational Control functional group 528a can perform functions related to flight scheduling, equipment scheduling, dispatch/flight operations, cabin crew tracking and scheduling, customer service, operation analysis, etc. The payload control functional group 528c can perform functions related to, for example, airline flight schedules, cargo sales, passenger sales, etc. The flight operations functional group 528e can perform functions related to, for example, flight crew rosters, navigational data and charts, fuel on board, airplane performance data, etc.

In addition to the functional areas described above, the APM 520 can further include an Airplane Functional area 524 and an external supplier functional area 526. The Airplane Functional area 524 includes an airplane functional group 530a and a crew kit functional group 530b. The external supplier functional area 526 includes a plurality of functional groups represented by squares. These functional groups can include entities outside the airline that influence the day-to-day operations of the airline in some way. For example, in the illustrated embodiment, the external supplier functional area 526 can include outside functional groups such as air traffic control 532a, fuel suppliers 532b, customs and immigration 532c, government security agencies 532d, etc. In other embodiments, the external supplier functional area 526 can include other functional groups.

The architecture of the APM 520 described above is but one example of an airline process model configured in accordance with the present invention. Accordingly, in other embodiments, other airline process models configured in accordance with the present invention can include other arrangements of functional areas and/or functional groups. Further, in such embodiments, the functional groups can include other processes in addition to, or in place of, the processes included in the APM 520.

The foregoing description of the display page 500 provides a broad overview of the architecture of the APM 520. Additional details of the various functional areas included in the APM 520 are provided for reference in corresponding FIGS. 5B-5I. Some of the symbols illustrated in FIGS. 5B-5I are described below with reference to FIG. 6.

Figure 6:
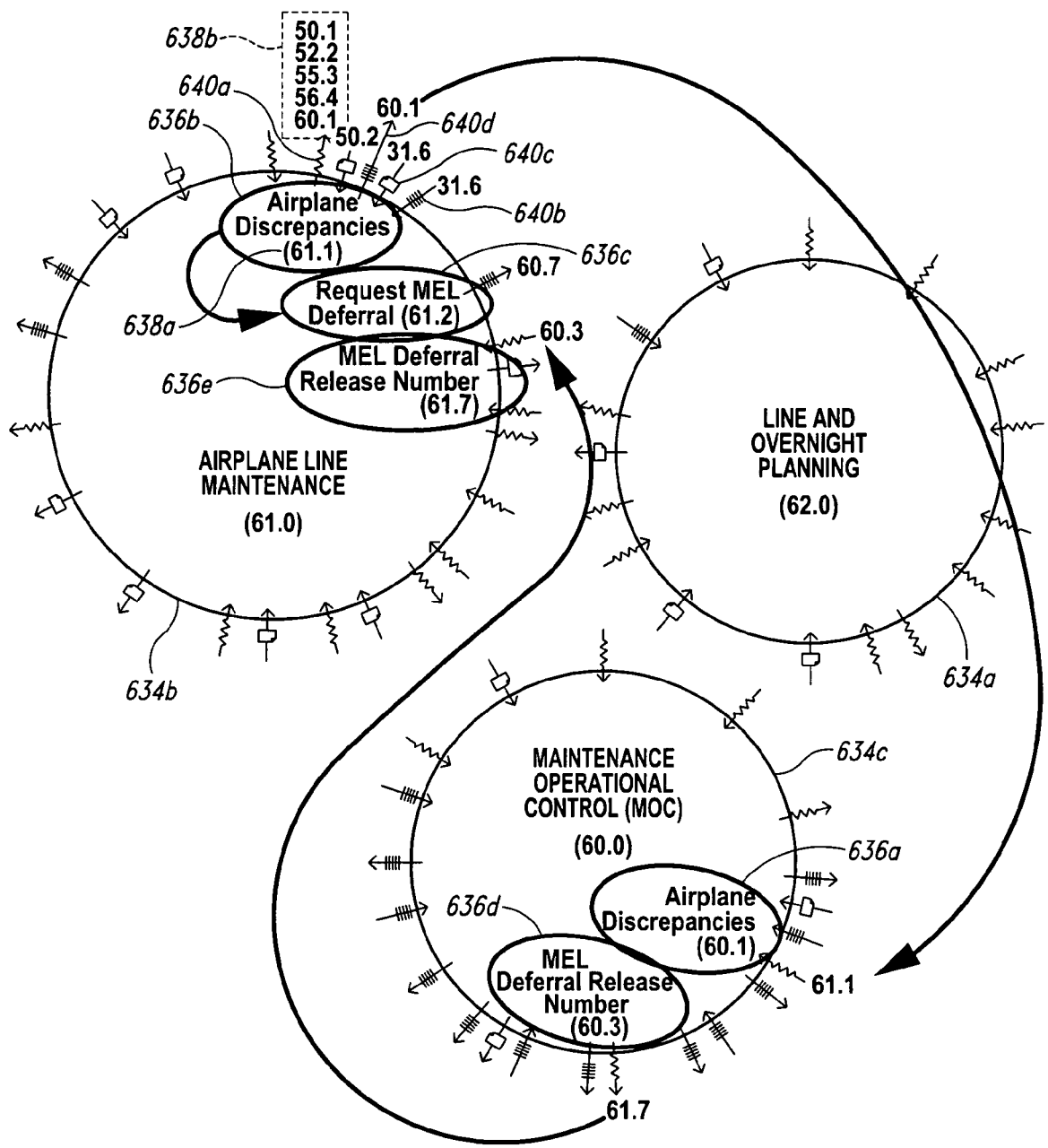
FIG. 6 is a schematic diagram of a display page illustrating an enlarged portion of the airline process model of FIG. 5 for the purpose of graphically illustrating how different functional groups in the model respond to challenges and events that occur in day-to-day operations.

FIG. 6 is a schematic diagram of a display page 600 illustrating an enlarged portion of the APM 520 of FIG. 5A. Specifically, the display page 600 illustrates the functional groups in the Aircraft Maintenance and Engineering functional area 522c that are responsible for Overnight Planning 634a, Airplane Line Maintenance 634b, and Maintenance Operational Control 634c. Each of the functional groups 634 includes a plurality of corresponding processes or functions.

The Airplane Line Maintenance functional group 634b, for example, includes an Airplane Discrepancies function 636b and a request MEL (minimum equipment list) deferral function 636c. Further, the maintenance operational control functional group 634c includes, among others, an Airplane Discrepancies function 636a.

Each function in the different functional groups includes a function identifier 638. For example, the Airplane Discrepancies function 636b includes a first function identifier 638a (i.e., "61.1"). The function identifiers 638 are used to designate the destinations of various types of information (identified individually as information flows 640a-d) that flow between the different functional groups.

Each individual information flow 640 has a particular graphical representation that represents the particular type of information that is exchanged. Referring to the Airplane Discrepancies function 636b, for example, the first information flow 640a is represented by a first line type (e.g., a jagged line) to illustrate that digital information is sent from the Airplane Discrepancies function 636b. Because the arrow on the jagged line points away from the Airplane Discrepancies function 636b, this indicates that the digital information is provided from the Airplane Discrepancies function 636b to the other functions identified by the second function identifiers 638b.

Figure 5G:
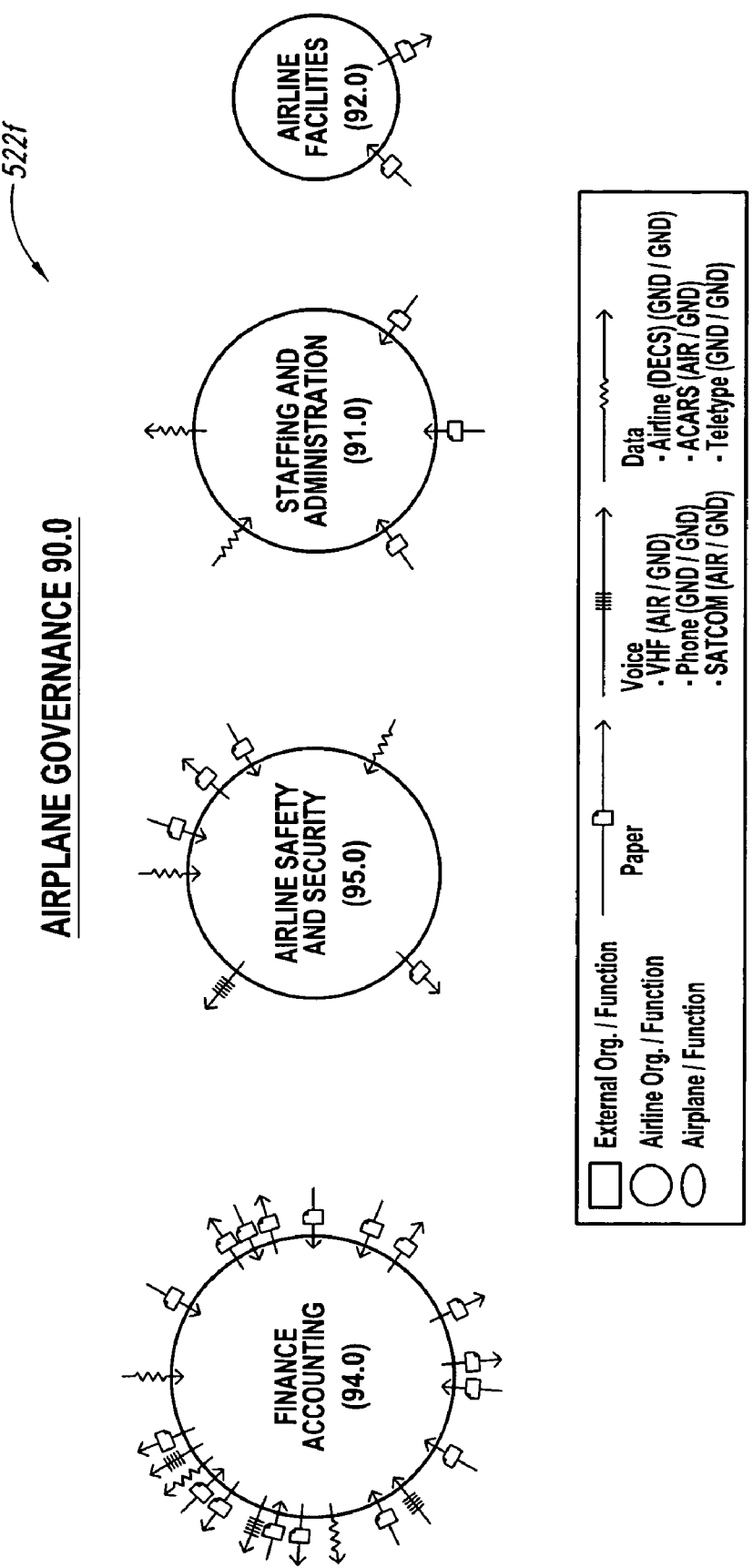
Figure 5I:
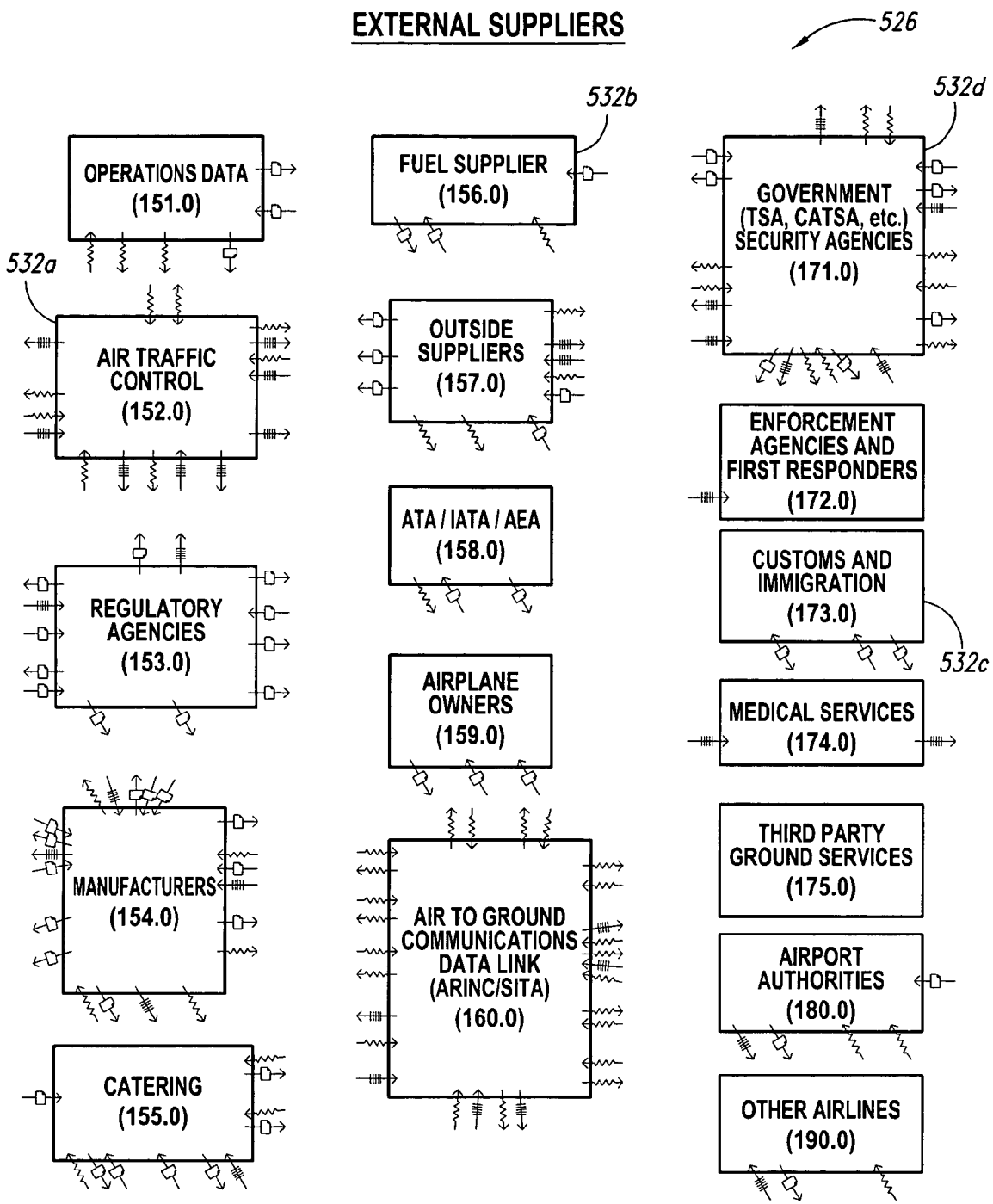

The broken line and the associated arrow of the second information flow 640b indicates that voice data is transmitted to the Airplane Discrepancies function 636b from the function having the identifier 31.6 (for reference, the function identifier 31.6 corresponds to a logbook entries function included in the crew kit functional group 530b illustrated in FIGS. 5A and 5G). The page symbol illustrated of the third information flow 640c indicates that paper copies of information are transmitted to the Airplane Discrepancies function 636b from the 31.6 function. Further, the broken line and the outwardly pointing arrow of the fourth information flow 640d indicates that the Airplane Discrepancies function 636b transmits voice data to the 60.1 function (i.e., the Airplane Discrepancies function 636a of the maintenance operational control functional group 634c).

As mentioned above, the APM 520 (FIG. 5A) can be used to graphically illustrate how the different functional groups respond to challenges and events that occur in the day-to-day operations of the airline. The following example illustrates one way the portion of the APM 520 shown in FIG. 6 can be used in this manner. In this example, an airplane discrepancy occurs and a line mechanic troubleshoots the discrepancy as part of the Airplane Discrepancies function 636b. The line mechanic then determines if an MEL deferral is the appropriate response in a Request MEL Deferral function 636c. Next, the line mechanic notifies the Airplane Discrepancy Function 636a via voice data that a discrepancy was reported. The MEL Deferral Release Number function 636d of the Maintenance Operational Control functional group 634c then sends the line mechanic an MEL deferral number via digital data. The line mechanic receives the digital data in a corresponding MEL Deferral Release Number function 636e of the Airplane Line Maintenance functional group 634. The line mechanic then walks the MEL deferral number to the airplane as paper data traveling from the MEL deferral release number function 636e to the log book entry function of the Crew Kit functional group 530b (FIG. 5G).

As the foregoing example illustrates, the APM embodiment described in FIG. 6 provides a useful graphical tool for visualizing the various processes that must be carried out by the airline to respond to a particular problem or event. As described in greater detail below, this feature of the APM can also be used to identify inefficient processes that can be improved by implementing various products and services. Further, this feature is also useful for visualizing and contrasting how the products and services, if implemented, can improve the existing "as is" processes.

Figure 7:
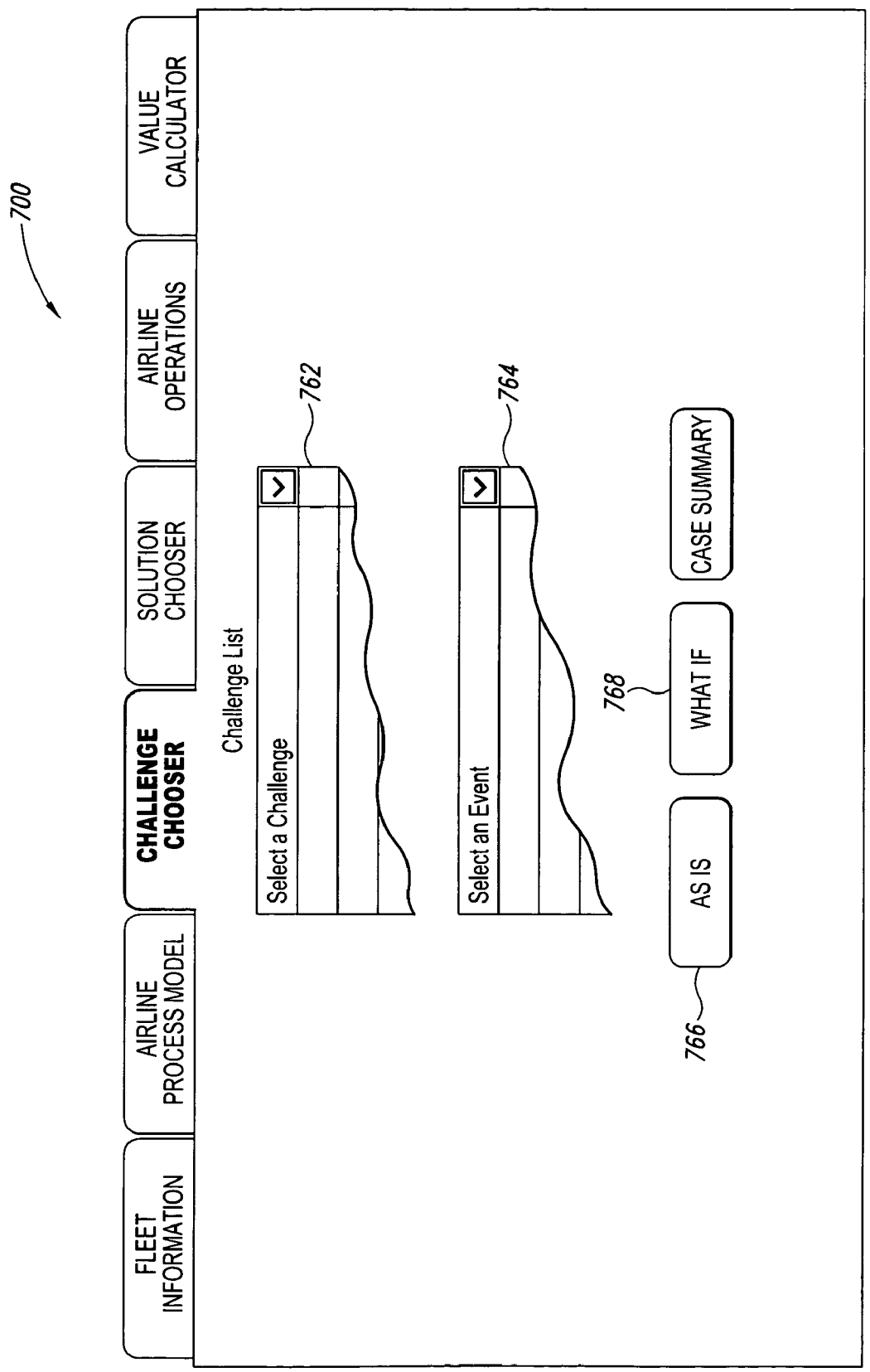
FIG. 7 is a schematic diagram of a display page for selecting a "challenge" and an associated "event" in accordance with an embodiment of the invention.

FIG. 7 is a schematic diagram of a display page 700 for selecting a "challenge" and an associated "event" in accordance with an embodiment of the invention. The display page 700 can include a challenge drop-down menu 762 and an event drop-down menu 764. The user can begin by selecting a challenge from the challenge drop-down menu 762. As explained above with reference to FIG. 2, a "challenge" is an operational problem facing the airline that is associated with one or more related "events." Examples of challenges include "delays and cancellations," "maintenance program compliance," "crew productivity," and "air traffic routing." Next, the user can select an associated event from the event drop-down menu 764. An event is an airline operational circumstance to which the APM 520 (FIG. 5A) responds, such as "fuel quantity indicator failure." After making these selections, the user can select an "as is" button 766 to bring up an "as is" event model that graphically illustrates how the relevant portion of the APM 520 responds to the selected event.

Figure 8:
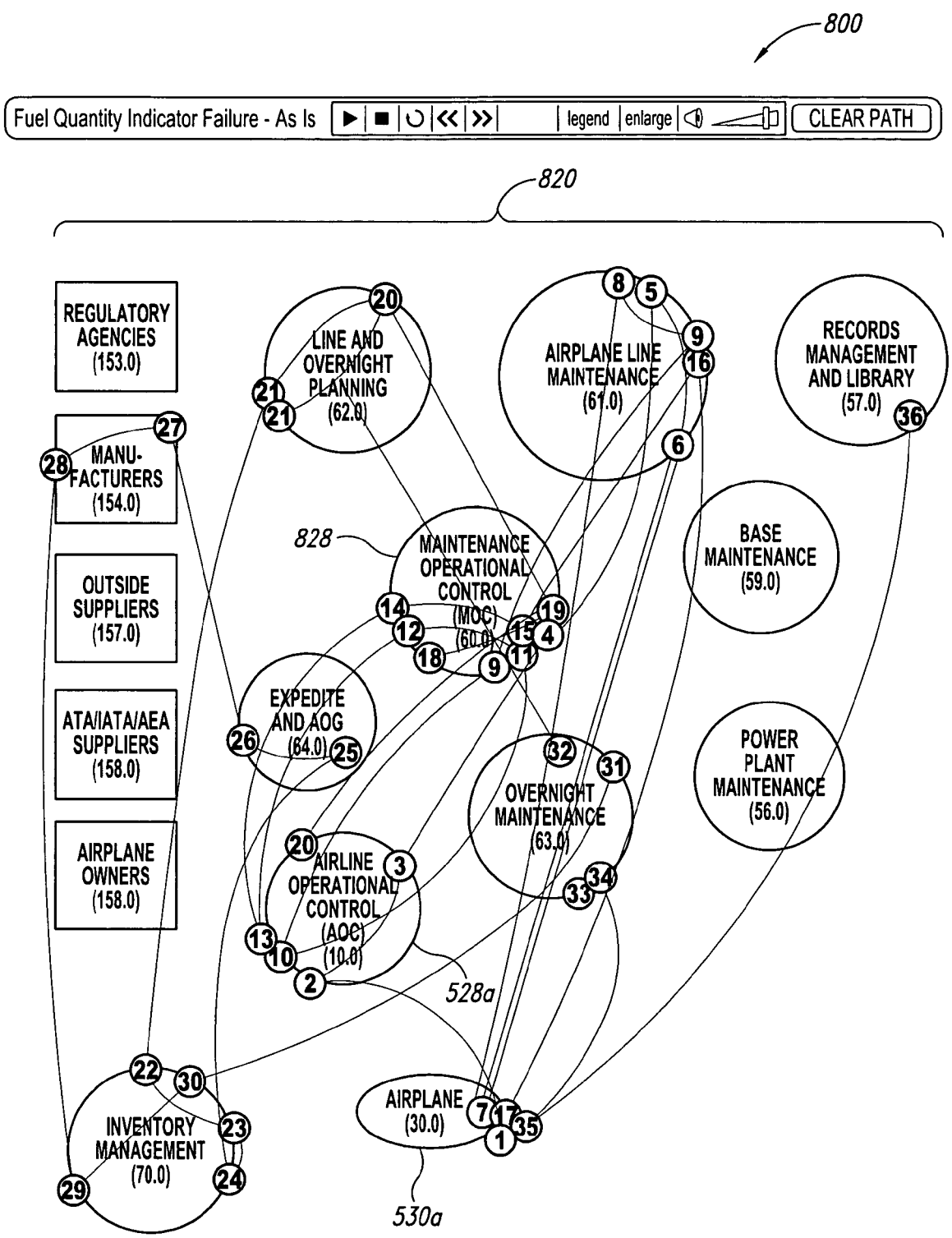
FIG. 8 is a schematic diagram of a display page that graphically illustrates an "as is" event model in accordance with an embodiment of the invention.

FIG. 8 is a schematic diagram of a display page 800 illustrating an "as is" event model 820 configured in accordance with an embodiment of the invention. The "as is" event model 820 graphically illustrates how the relevant functional groups in the APM 520 (FIG. 5A) respond to the fuel quantity indicator failure event selected via the display page 700 of FIG. 7. In the illustrated example, the relevant functional groups include the airplane functional group 530a, the Airline Operational Control functional group 528a, and a maintenance operational control functional group 828, among others. Each of these functional groups performs functions in response to the fuel quantity indicator failure. These individual functions are identified by numbers that correspond to the sequence in which the functions are performed. For example, the first step in response to the fuel quantity indicator failure (identified by the number 1) is performed by the Airplane functional group 530a when the pilot report is recorded (via voice transmission) in the log book; the second step (identified by number 2) is performed by the Airline Operational Control functional group 528a when the pilot reports the problem via another voice transmission; and so on from there.

Figure 9:
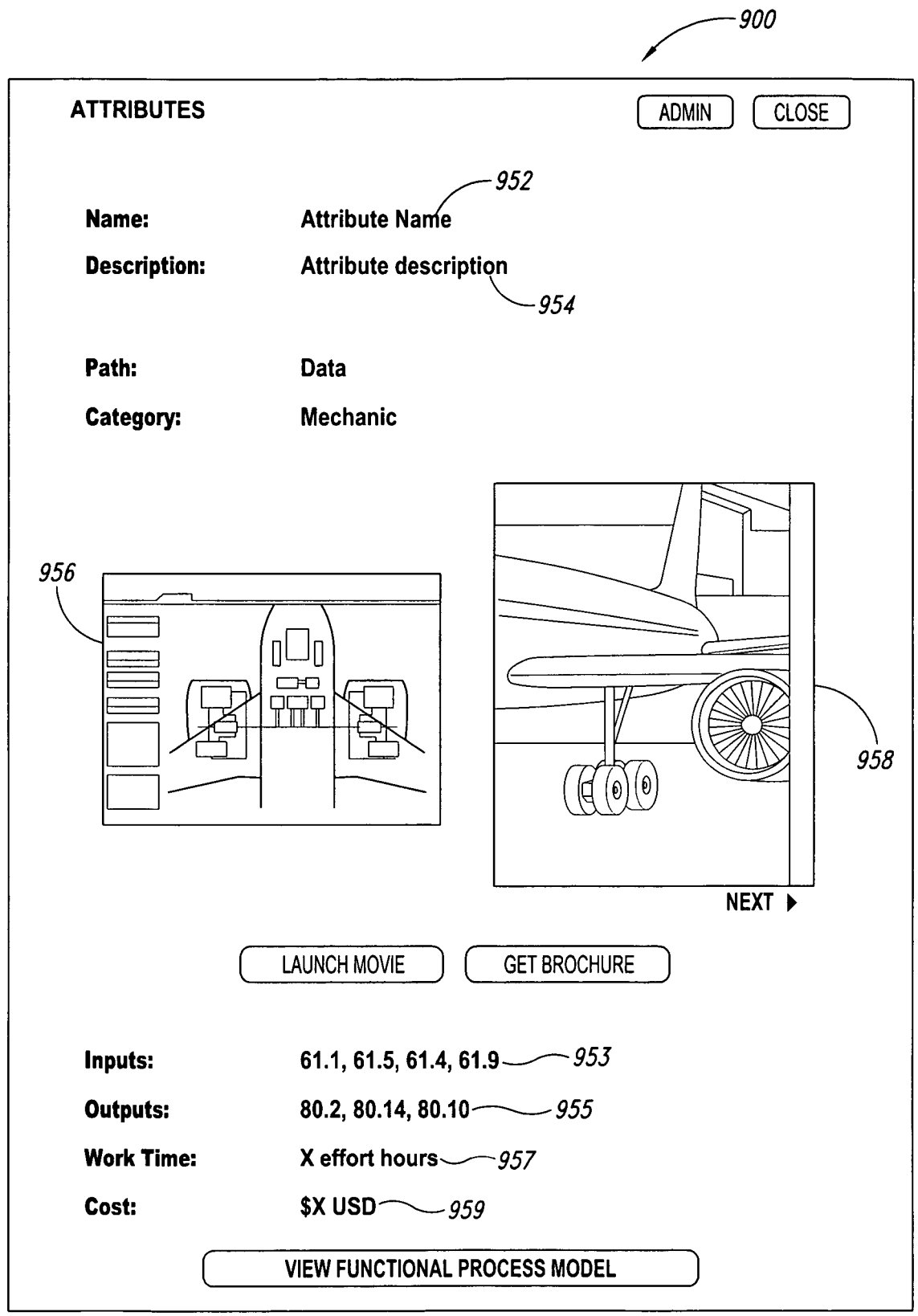
FIG. 9 is schematic diagram of a display page for reviewing and/or editing attributes of a particular function in accordance with an embodiment of the invention.

Each of the functional steps noted by a number in FIG. 8 includes attributes that describe the function performed. In one aspect of this embodiment, the user can review and/or edit these attributes with a display page 900 schematically illustrated in FIG. 9. In one embodiment, the user can bring up the display page 900 for a particular function by simply clicking on the number that corresponds to that function on the "as is" event model 820. Referring to FIG. 9, the display page 900 can include a number of data fields with which the user can alter the various attributes associated with the selected function. For example, the attributes display page 900 includes a name field 952 and an attribute description field 954. The attribute display page 900 also includes a movie feature 956 and a brochure feature 958. The movie feature 956 allows the user to view a movie describing aspects of the particular function. Similarly, the brochure feature 958 allows the user to view and/or order a hard copy of a brochure describing the particular function.

In addition to the foregoing, the attribute display page 900 also includes an input field 953, an output field 955, a work time field 957, and a cost field 959.

The input field 953 displays the current set of functions that provide input to the selected function. Similarly, the output field 955 lists the current set of functions that receive output from the selected function. The work time field 957 shows the number of man-hours required to perform the function, and the cost field 959 shows the cost in dollars of performing the function. By editing the attribute display page 900, the user can automatically modify the corresponding airline process model as required to accurately reflect the actual processes performed by the airline.

Returning to FIG. 8, the "as is" event model 820 assumes that no new products or services have been implemented by the airline to facilitate the various operational processes and streamline how the airline responds to different challenges and events. As a result, one advantage of the "as is" event model 820 is that it allows the airline operator to easily see the inefficiencies that may exist in Airline Operations and the relative need for products and services that can streamline these operations. If the airline operator is interested in seeing how various products and services can improve the situation, the user can do so by returning to the display page 700 described above with reference to FIG. 7 and selecting a "what if" button 868 (see FIG. 7).

Figure 10:
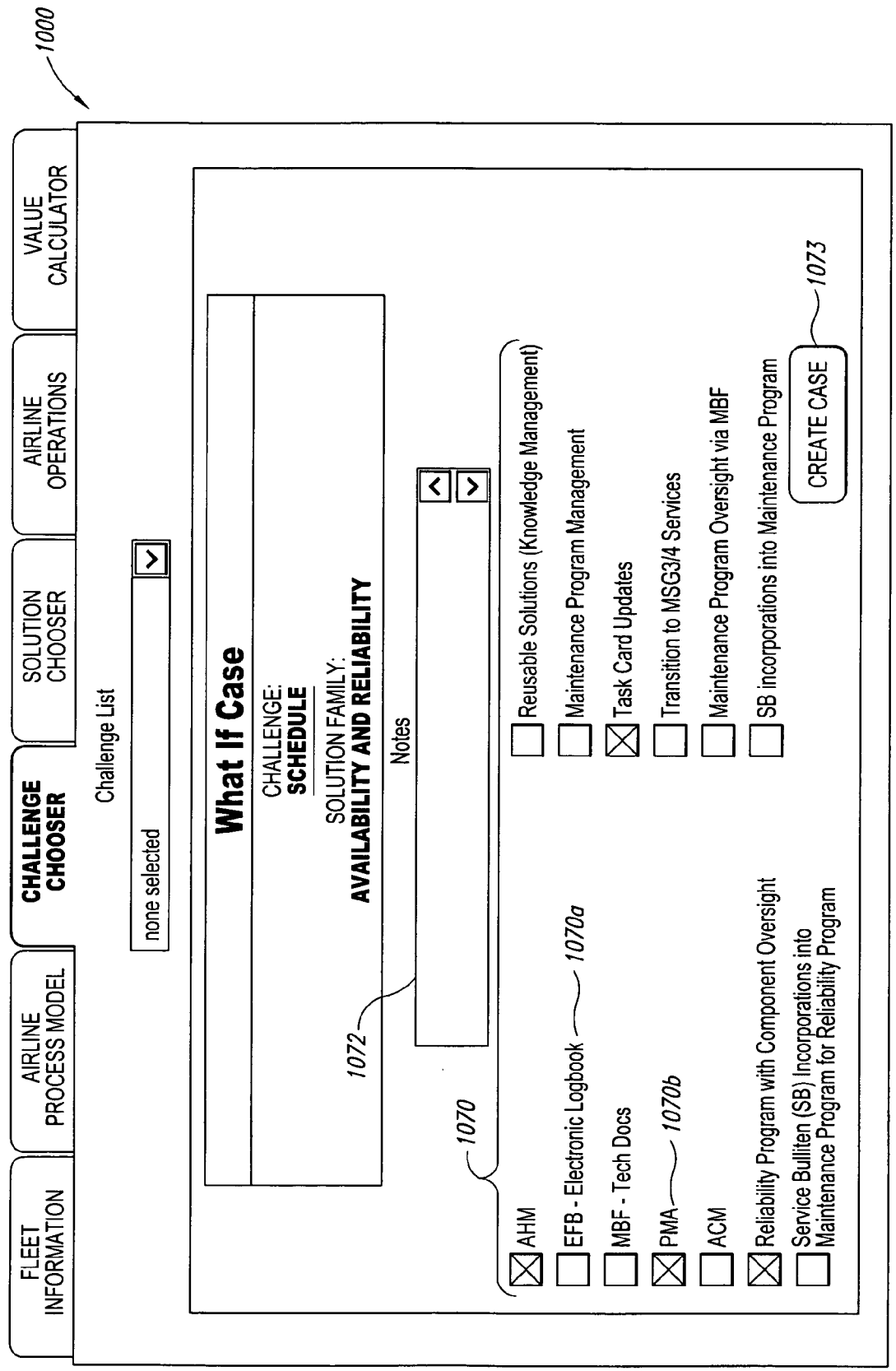
FIG. 10 is a schematic diagram of a display page for selecting a "what if" case in accordance with an embodiment.

FIG. 10 is a schematic diagram of a display page 1000 for selecting a "what if" case in accordance with an embodiment. The display page 1000 includes a list of products and services 1070 from which the user can select. The products and services 1070 can include various software and database programs that automate and/or partially automate various processes carried out by the airline functional groups. For example, EFB-electronic log book 1070a is an Internet enabled log book that allows pilots to enter information about each flight electronically. PMA 1070b is a portable maintenance aid (e.g., a laptop-like device) that aircraft mechanics can carry with them onto the airplane when conducting maintenance, repairs, etc. This tool allows them to electronically access drawings, maintenance instructions, task cards, etc. without needing to get off the airplane and find hard copies of the information. As a result, this product can greatly increase the efficiency of the mechanic.

After reviewing the different products and services 1070, the user can select the products he or she wishes to implement by checking the adjacent box. In addition, the user can also enter notes about the particular "what if" case in an note field 1072. Once the user has selected the desired products and services and entered any relevant notes, the user can select a "create case" button 1073 to create a corresponding "what if" case.

Figure 11:
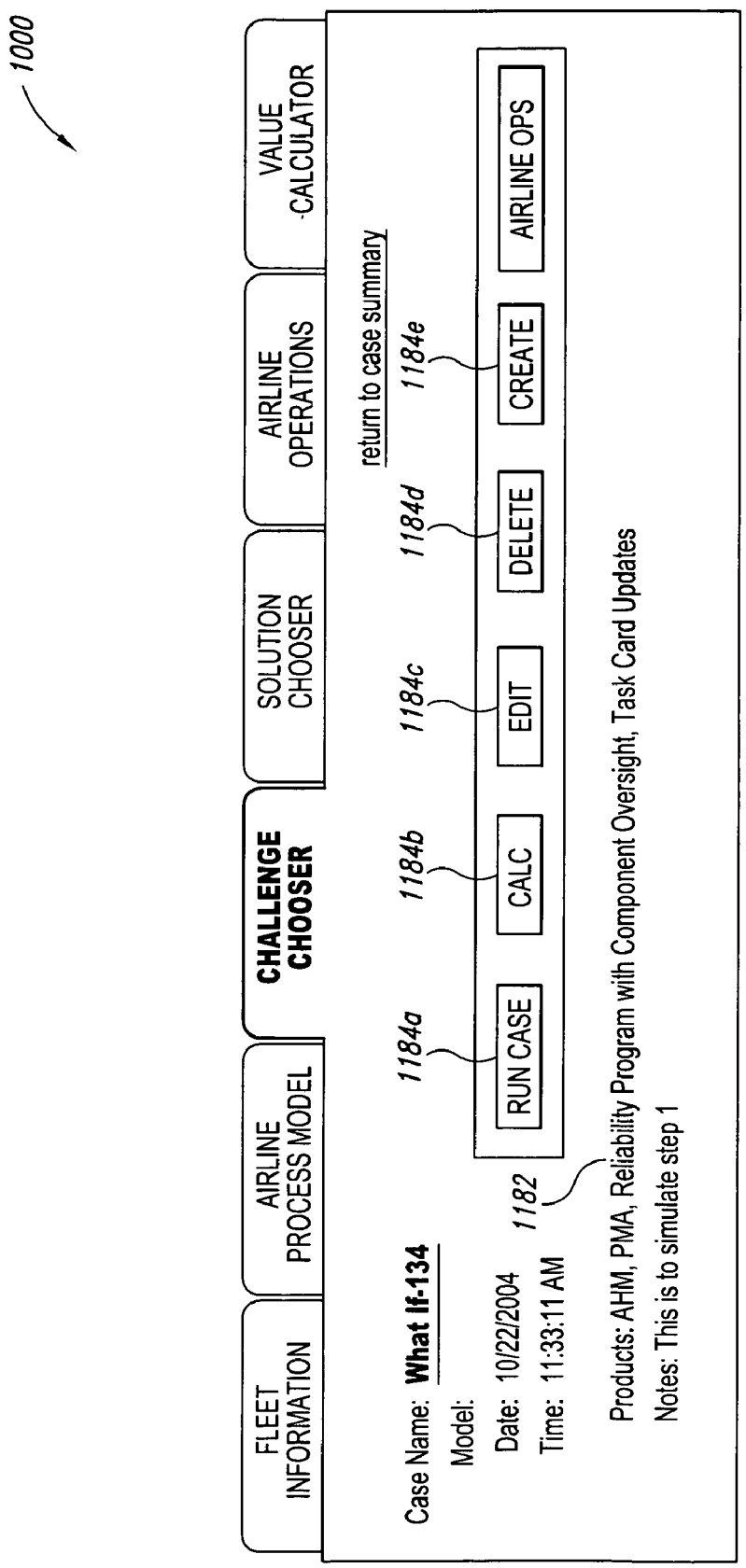
FIG. 11 is a schematic diagram of a display page listing user options after a "what if" case has been created.

FIG. 11 is a schematic diagram of a display page 1100 listing options for the user after a "what if" case has been created. The display page 1100 includes a case name field 1180 that identifies the particular "what if" case, and a products field 1182 that lists the selected products that the user wishes to implement in the "what if" case. In addition, the display page 1100 further includes a plurality of options buttons 1184. The option buttons include, for example, a run case option 1184a, a calculate option 1186b, an edit option 1184c, a delete option 1184d, and a create option 1184e. In this embodiment, selecting the run case option 1184a brings up a display page that graphically illustrates a "what if" event model that corresponds to the selected "what if" case. Selecting the edit option 1184c enables the user to edit the selected "what if" case. Selecting the delete option 1184d enables the user to delete the particular case, and selecting the create option 1184e enables the user to create a new "what if" case.

Figure 12:
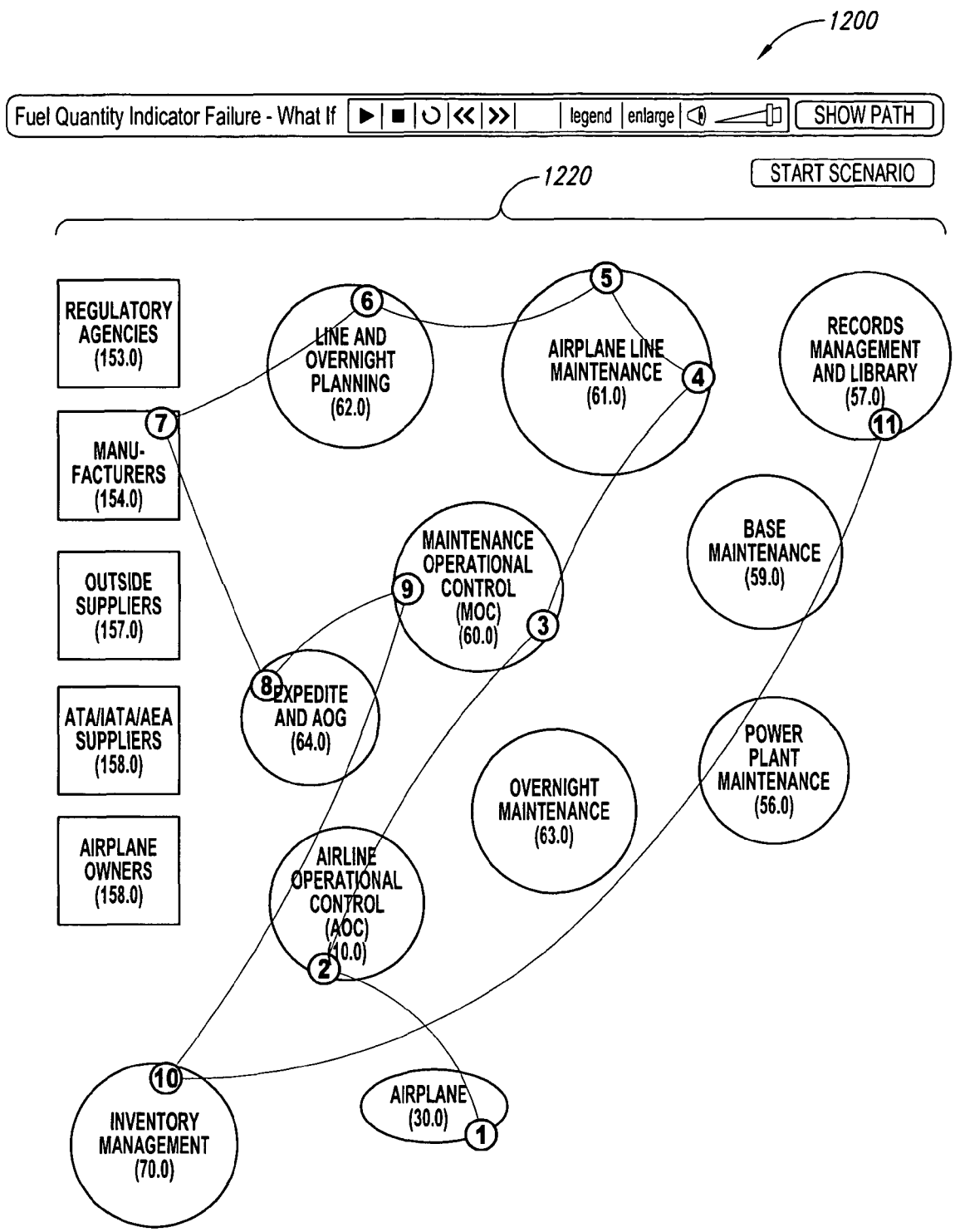
FIG. 12 is a schematic diagram of a display page that graphically illustrates a "what if" event model in accordance with an embodiment of the present invention.

FIG. 12 is a schematic diagram of a display page 1200 graphically illustrating a "what if" event model 1220 corresponding to the "what if" case selected in FIG. 10. Comparing the "what if" event model 1220 to the baseline "as is" event model 820 (FIG. 8) clearly illustrates that implementation of the selected products and services would greatly reduce the number of functional steps the airline takes to respond to the particular challenge and event selected in FIG. 7 (i.e., the fuel quantity indicator failure). Accordingly, this tool can provide a sales agent with a means for quickly and convincingly demonstrating the benefits of implementing the different products and services to a prospective airline.

Figure 13:
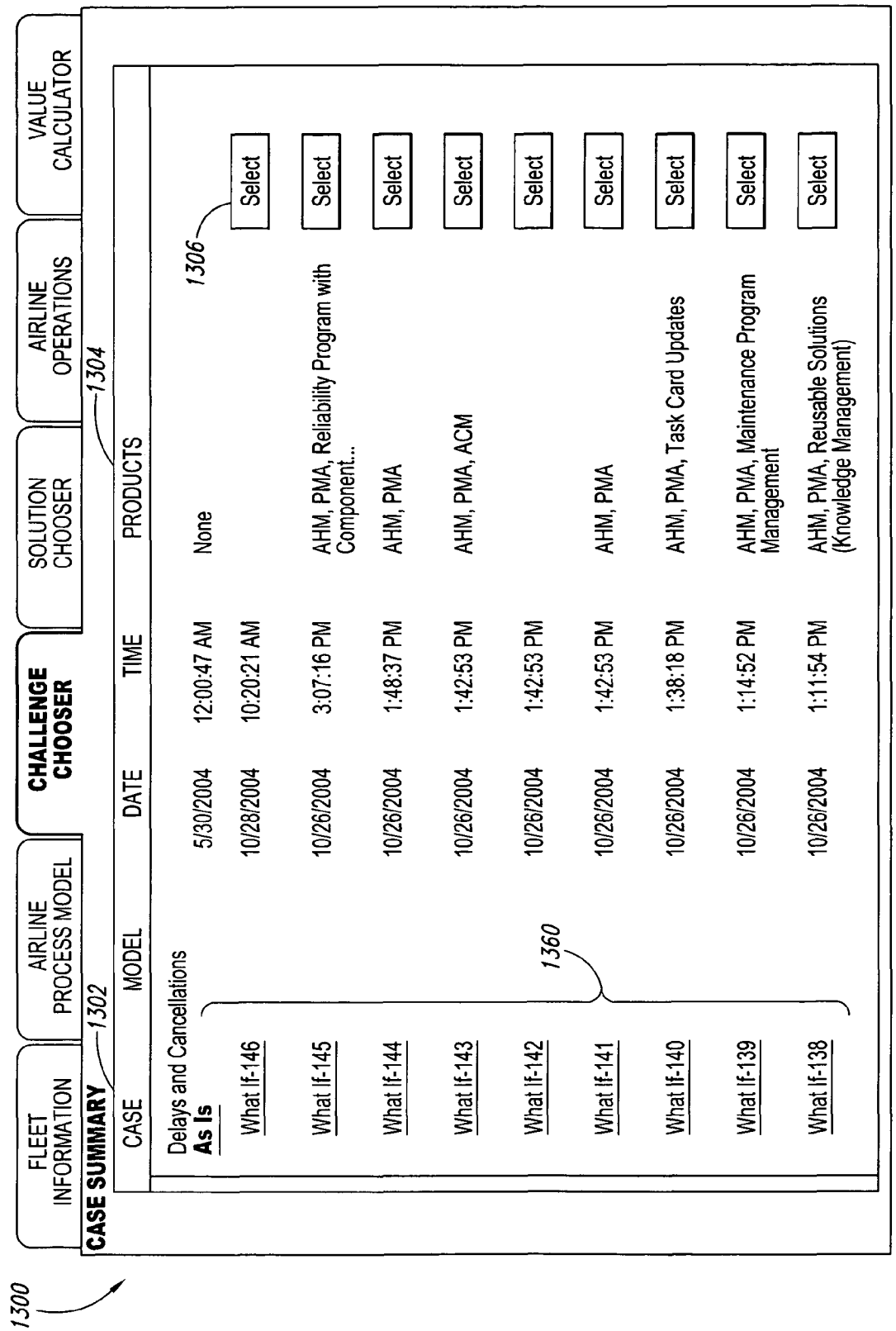
FIG. 13 is a schematic diagram of a display page that provides information about existing "as is" and "what if" event cases in accordance with an embodiment of the invention.

FIG. 13 is a schematic diagram of a display page 1300 that includes a list 1360 of existing "as is" and "what if" event cases configured in accordance with an embodiment of the invention. A case identifier for each case is provided in a case column 1302. User-entered notes for each case can also be provided under the corresponding case identifier. For "what if" cases, the products selected by the user are listed in an adjacent product column 1304. In one embodiment, the display page 1300 can be used as a reference for selecting from previously-run event cases. If the user wishes to view an event model corresponding to a particular case, the user can do so by selecting an appropriate select button 1306.

In addition to the graphical methods described above for comparing a "what if" event model that implements various products and services to an existing "as is" event model, the present invention also includes various methods and systems for presenting cost, schedule, and other data that illustrate the benefits of the selected products and services. For example, returning to FIG. 11, selecting the calc button 1084b can bring up a value calculator display page 1400 as schematically illustrated in FIG. 14.

Figure 14:
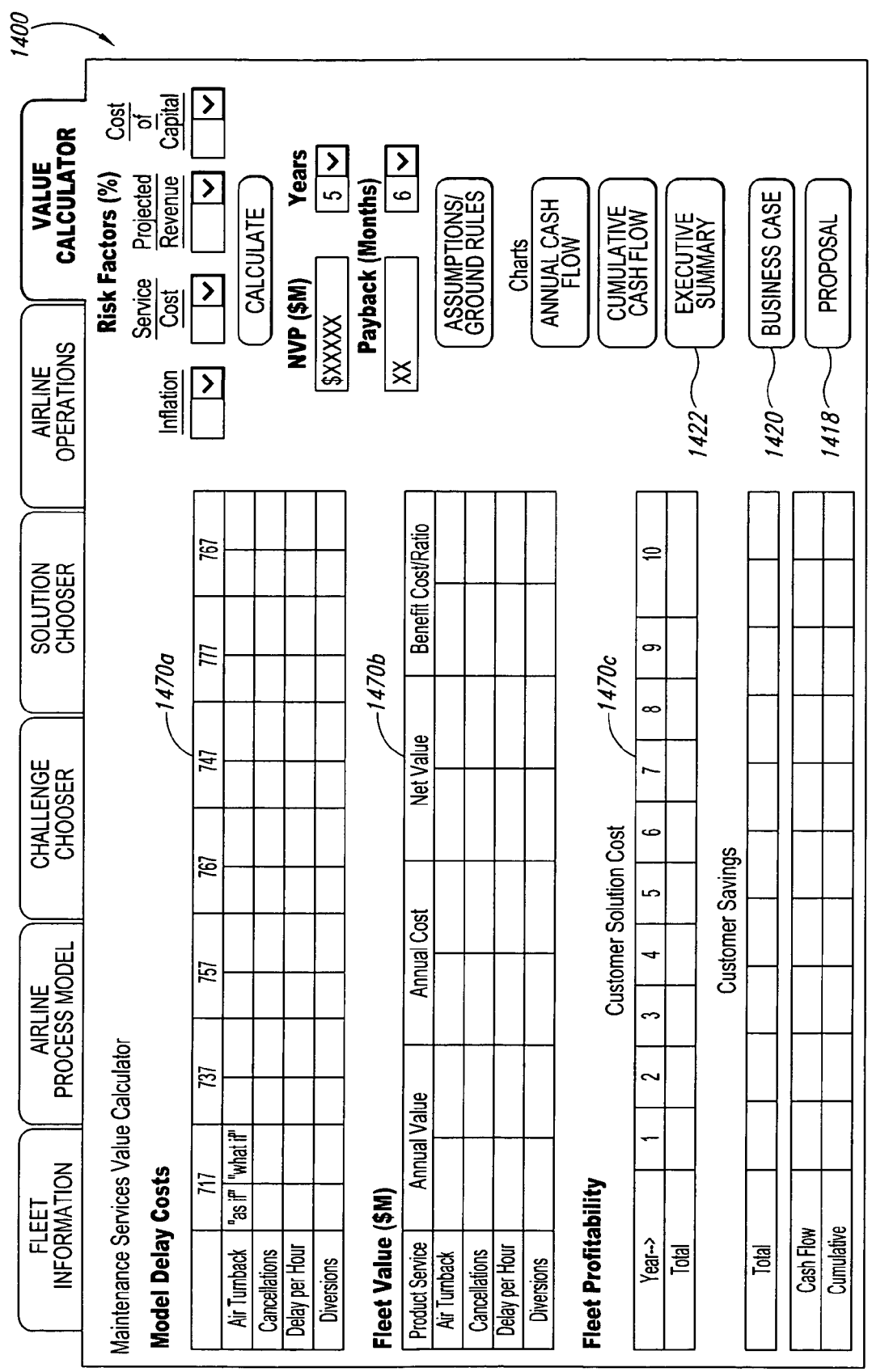
FIG. 14 is a schematic diagram of a display page for comparing costs associated with an "as is" model to costs associated with a corresponding "what if" model in accordance with an embodiment of the invention.

Referring to FIG. 14, the display page 1400 can include a number of spreadsheet fields 1470 (identified individually as spreadsheet fields 1470a-c) that compare costs associated with an "as is" model to costs associated with a corresponding "what if" model. For example, the model delay cost field 1470a can compare the costs of various delays in the "as is" model to the costs of delays in the "what if" model for different aircraft types. The fleet value field 1470b includes similar data corresponding to the annual value, the annual cost, the net value and the benefit cost/ratio for the delays. The fleet profitability field 1470c includes data that compares the year-by-year cost to the customer of the selected solutions (i.e., the selected products and services) vs. the year-by-year savings from implementing the solutions. As those of ordinary skill in the art will appreciate, the forgoing spreadsheets are merely representative of the various types of tools that can be included with the present invention to facilitate the comparison and/or analysis of the different product and/or services.

Figure 15:
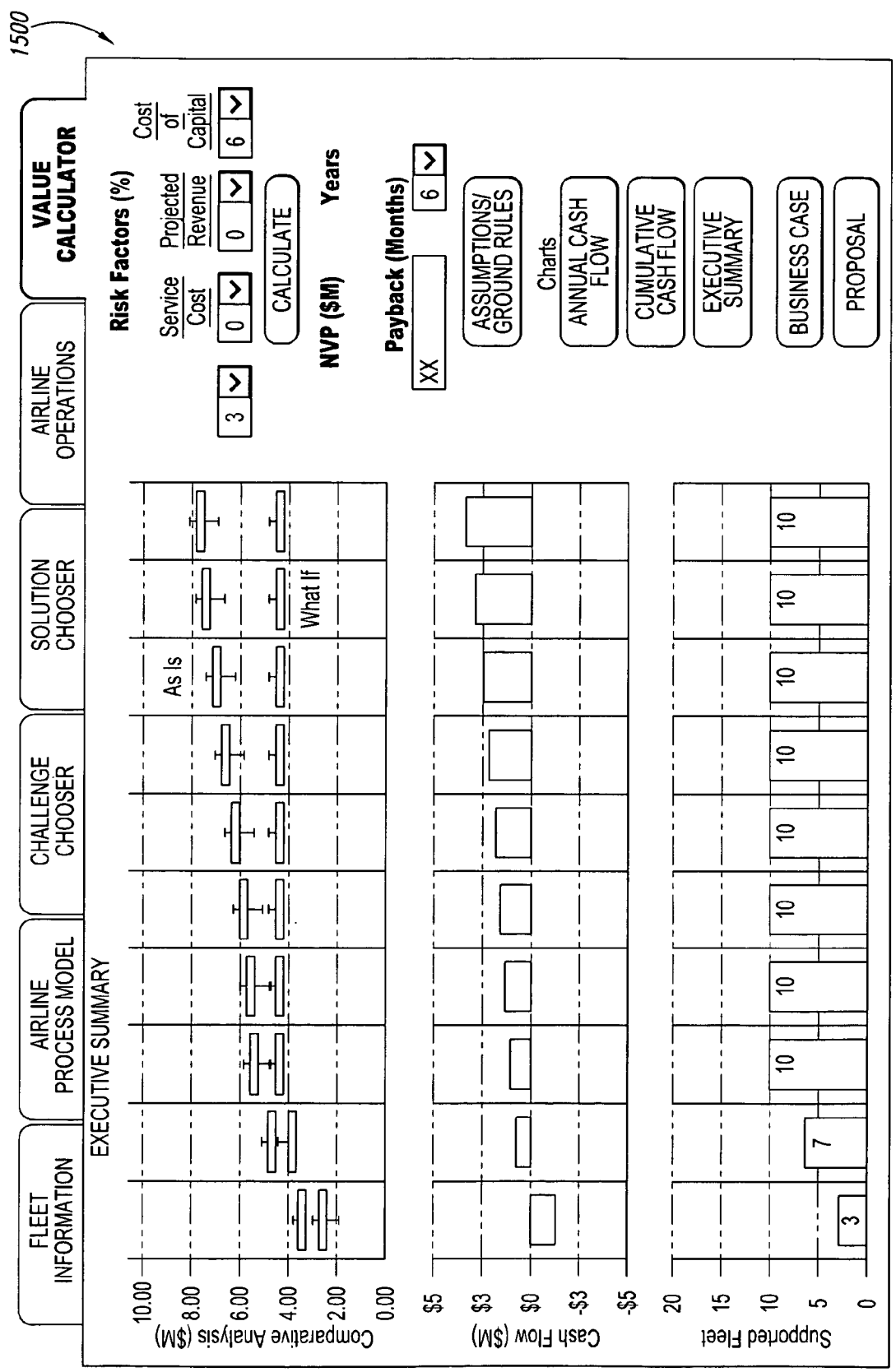
FIG. 15 is a schematic diagram of a display page that graphically describes the results of comparative analyses between an "as is" case and a corresponding "what if" case in accordance with an embodiment of the invention.
Figure 17:
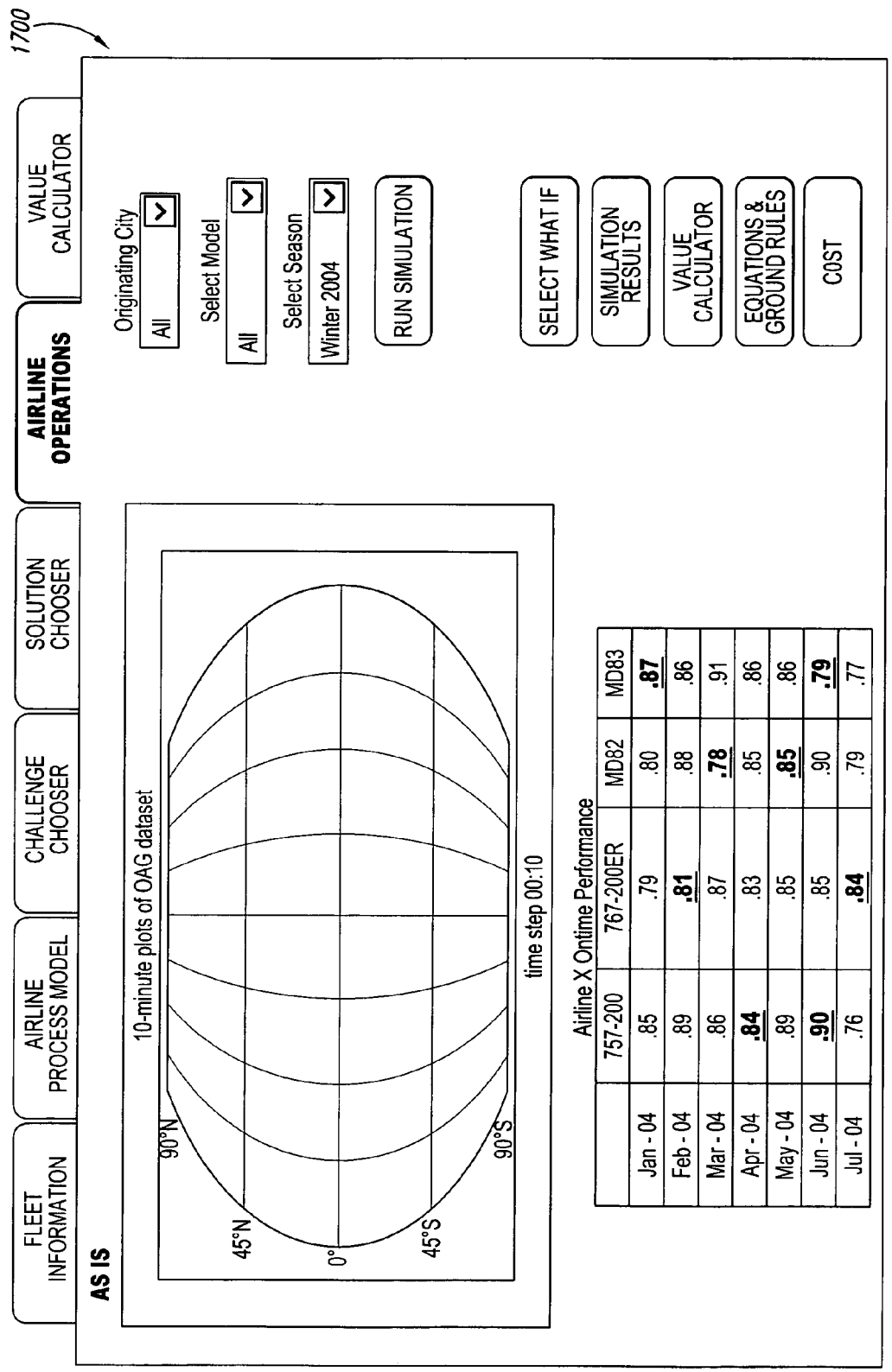
FIG. 17 is a schematic diagram of a display page providing airline schedule performance data in accordance with a further embodiment of the invention.

In addition to the spreadsheet fields 1470 described above, the display page 1400 can also include a number of page selectors that can take the user to other forms of output related to the selected products and services. For example, by selecting a proposal button 1418, the user can request a print out of a products and services proposal to give the prospective customer. By selecting a business case button 1420, various portions of the relevant data described above can be assembled into a report with associated value analyses that can be printed out for the customer. Similarly, by selecting an executive summary button 1422, the user can request additional spreadsheet data, such as that illustrated in the display page 1500 of FIG. 15 which graphically describes the results of comparative analyses between the "as is" case and the "what if" case. The executive summary can additionally include spreadsheet data, such as that illustrated in a display page 1600 of FIG. 16, which allows the user to "scale-up" the benefits associated with the selected products and services for various portions of the current airline fleet and for future fleet growth. The executive summary can further graphical data and schedule performance data, such as that illustrated in a display page 1700 of FIG. 17.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Further, while advantages associated with certain embodiments of the invention have been described in the context of those embodiments, other embodiments may also exhibit such advantages, and no embodiment need necessarily exhibit such advantages to fall within the scope of the invention. Accordingly, the invention is not limited, except as by the appended claims.

We claim:

1. A method in a computing device having a memory and a processor for marketing at least one of products and services associated with airline operations, the method comprising:
    presenting a display page containing a plurality of operational circumstances related to operation of an airline, wherein the display page is generated by the processor executing instructions stored in the memory of the computing device;
    receiving a selection of one of the operational circumstances from a user via the display page;
    presenting a first process model schematically illustrating the airline as a plurality of different functional groups in which each functional group is responsible for performing a plurality of defined functions, the first process model describing a first sequence of functional steps performed by the different functional groups when the airline responds to the selected operational circumstance, wherein the first process model is generated by the processor executing instructions stored in the memory;
    presenting a plurality of products and services configured to facilitate operation of the airline;
    receiving a selection of at least one of the products and the services from the user; and
    presenting a second process model, the second process model describing a second sequence of functional steps performed by the different functional groups when the airline responds to the selected operational circumstance after the airline has implemented the at least one product and service configured to facilitate operation of the airline, wherein the second sequence of functional steps is different than the first sequence of functional steps described by the first process model;
    wherein the first process model and the second process model are presented by the processor executing instructions stored in the memory.

2. The method of claim 1 wherein presenting a first process model includes presenting a model that schematically illustrates the airline as a plurality of different functional groups in which each functional group is responsible for performing a plurality of defined functions related to operation of the airline.

3. The method of claim 1 wherein presenting a first process model includes presenting a model that schematically illustrates the airline as a plurality of different functional groups with a plurality of different data flows between the different functional groups.

4. The method of claim 1 wherein presenting a first process model includes presenting a model that schematically illustrates the airline as at least a first functional group and a second functional group, wherein a first data transmission between the first and second functional groups is graphically represented by a first symbol, and wherein a second data transmission between the first and second functional groups is graphically represented by a second symbol.

5. The method of claim 1 wherein presenting a first process model includes presenting a model that schematically illustrates the airline as at least a first functional group and a second functional group, wherein a voice data transmission between the first and second functional groups is graphically represented by a first symbol, and wherein a digital data transmission between the first and second functional groups is graphically represented by a second symbol.

6. The method of claim 1 wherein presenting a first process model includes presenting a model that graphically illustrates a first functional group responsible for aircraft flight operations and a second functional group responsible for aircraft ground operations.

7. The method of claim 1 wherein presenting a first process model includes presenting a model that graphically illustrates a first functional group responsible for aircraft flight operations and a second functional group responsible for aircraft maintenance.

8. A computer-implemented method for marketing products, services, or products and services related to airline operations, the method comprising:
    selecting at least one event related to operation of an airline, wherein the event is selected from a first display page generated by a processor executing instructions stored in a memory of a computing device;
    obtaining a first process model schematically illustrating how the airline responds to the selected event, wherein the first process model schematically illustrates the airline as a plurality of different functional groups in which each functional group is responsible for performing a plurality of defined functions, wherein the first process model further illustrates a first sequence of functional steps performed by the different functional groups in response to the selected event, and wherein the first process model is generated by the processor executing instructions stored in the memory;
    selecting a product, a service, or a product and a service configured to facilitate operation of the airline from a plurality of offered products and services, wherein the product, service, or product and service is selected from a second display page generated by the processor executing instructions stored in the memory; and
    obtaining a second process model schematically illustrating a second sequence of functional steps performed by the different functional groups of the airline in response to the selected event after implementation of the selected product, service, or product and service by the airline, wherein the second sequence of functional steps is different than the first sequence of functional steps illustrated by the first process model, and wherein the second process model is generated by the processor executing instructions stored in the memory.

9. The method of claim 8 wherein obtaining a first process model includes obtaining a model that schematically illustrates the airline as a plurality of different functional groups in which each functional group is responsible for performing a preset list of functions related to operation of the airline.

10. The method of claim 8, further comprising:
    obtaining first cost data related to how the airline responds to the selected event before implementation of the selected product, service, or product and service; and obtaining second cost data related to how the airline responds to the selected event after implementation of the selected product, service, or product and service.

11. The method of claim 8, further comprising obtaining a hard copy of a report that includes information about the selected product, service, or product and service.

12. The method of claim 8 wherein selecting a product, a service, or a product and a service includes selecting a computer-implemented service configured to facilitate operation of the airline.

13. A system for marketing products, services, or products and services related to the operation of an airline, the system comprising:
 means for presenting a plurality of operational circumstances related to operation of an airline;
 means for receiving a selection of one of the operational circumstances from a user;
 means for presenting a first process model schematically illustrating the airline as a plurality of different functional groups in which each functional group is responsible for performing a plurality of defined functions, the first process model describing first sequence of functional steps performed by the different functional groups when the airline responds to the selected operational circumstance;
 means for presenting a plurality of products and services configured to facilitate operation of the airline;
 means for receiving a selection of at least one of the products and the services from the user; and
 means for presenting a second process model, the second process model describing second sequence of functional steps performed by the different functional groups when the airline responds to the selected operational circumstance after the airline has implemented the at least one product and service configured to facilitate operation of the airline, wherein the second sequence of functional steps is different than the first sequence of functional steps described by the first process model;
 wherein the means for presenting the first process model and the second process model comprise computer-executable instructions for execution by a processor.

14. The system of claim 13 wherein the means for presenting a first process model include means for presenting a model that schematically illustrates data flow between the different functional groups in the airline.

15. The system of claim 13 wherein the means for presenting a first process model include means for presenting a model that schematically illustrates the airline as a plurality of different functional groups in which each functional group is responsible for performing a plurality of defined functions relating to operation of the airline.

16. The system of claim 13 wherein the means for presenting a first process model include means for presenting a model that schematically illustrates the airline as at least a first functional group and a second functional group, wherein a first data transmission between the first and second functional groups is graphically represented by a first symbol, and wherein a second data transmission between the first and second functional groups is graphically represented by a second symbol.

17. The system of claim 13 wherein the means for presenting a first process model include means for presenting a model that graphically illustrates a first functional group responsible for aircraft flight operations and a second functional group responsible for aircraft ground operations.

18. A computer-readable medium containing computer-executable instructions configured to cause a processor in a computer to automatically provide information about an airline related product, service, or product and service by a method comprising:
 receiving a selection of an airline;
 displaying a plurality of events relating to operation of the airline;
 receiving a selection of one of the events;
 at least partially in response to receiving the selection of the event, displaying an "as is" event model schematically illustrating the airline as a plurality of different functional groups in which each functional group is responsible for performing a plurality of defined functions, the "as is" model graphically illustrating a first sequence of functional steps performed by the different functional groups in the selected airline in response to the selected event;
 displaying at least one of an airline-related product and an airline-related service not implemented by the selected airline in the "as is" event model;
 receiving a selection of at least one of the airline-related product, service, or product and service not implemented by the selected airline in the "as is" event model; and
 at least partially in response to receiving the selection of the product, service, or product and service, displaying a "what if" event model graphically illustrating a second sequence of functional steps performed by the different functional groups in the selected airline in response to the selected event after the selected airline has implemented the selected product, service, or product and service, wherein the second sequence of functional steps is different than the first sequence of functional steps graphically illustrated by the "as is" model.

19. The computer-readable medium of claim 18, wherein the method further comprises:
 receiving a request for information about at least one of the functional steps; and
 at least partially in response to the receiving the request for information, providing a display page that describes attributes of the at least one functional step.

20. A computer-implemented method for marketing products, services, or products and services related to airline operations, the method comprising:
 selecting an airline;
 selecting at least one event related to operation of the airline, wherein the event is selected from a first display page generated by a processor executing instructions stored in a memory of a computing device;
 obtaining a first process model that schematically illustrates the airline as a plurality of different functional groups in which each functional group is responsible for performing a plurality of defined functions, wherein the first process model further illustrates a first sequence of functional steps performed by the different functional croups in response to the selected event, and wherein the first process model is generated by the processor executing instructions stored in the memory;
 selecting a product, a service, or a product and a service that are not implemented by the airline in the first process model, wherein the product, service, or product and service is selected from a second display page generated by the processor executing instructions stored in the memory; and
 obtaining a second process model that schematically illustrates a second sequence of functional steps performed by the different functional groups of the airline when the plurality of different functional groups respond to the selected event after implementation of the selected product, service, or product and service by the airline, wherein the second sequence of functional steps is different than the first sequence of functional steps, and wherein the second process model is generated by the processor executing instructions stored in the memory.

21. The method of claim 20, further comprising:

obtaining first cost data related to how the airline responds to the selected event before implementation of the selected product, service, or product and service; and obtaining second cost data related to how the airline responds to the selected event after implementation of the selected product, service, or product and service.

\* \* \* \* \*